US00RE38024E

(19) United States
(12) Reissued Patent
Adams et al.

(10) Patent Number: US RE38,024 E
(45) Date of Reissued Patent: Mar. 11, 2003

(54) ATTACHABLE ELECTRO-IMPULSE DE-ICER

(75) Inventors: Lowell J. Adams, North Canton, OH (US); Norbert A. Weisend, Jr., Cuyahoga Falls, OH (US); Thomas E. Wohlwender, Akron, OH (US)

(73) Assignee: Goodrich Corporation, Charlotte, NC (US)

(21) Appl. No.: 08/887,085

(22) Filed: Jul. 2, 1997

Related U.S. Patent Documents

Reissue of:
(64) Patent No.: 5,129,598
Issued: Jul. 14, 1992
Appl. No.: 07/455,129
Filed: Dec. 22, 1989

(51) Int. Cl.[7] ..... B64D 15/00; B64D 15/16
(52) U.S. Cl. ..... 244/134 D; 244/134 A
(58) Field of Search ..... 244/134 D, 134 A, 244/134 R; 310/306; 340/582

(56) References Cited

U.S. PATENT DOCUMENTS

| | | | | | |
|---|---|---|---|---|---|
| 3,549,964 | A | | 12/1970 | Levin et al. | 317/262 |
| 3,672,610 | A | | 6/1972 | Levin | 244/134 |
| 3,779,488 | A | | 12/1973 | Levin | 244/134 |
| 3,809,341 | A | | 5/1974 | Levin et al. | 244/134 |
| 4,292,502 | A | | 9/1981 | Adams | 219/483 |
| 4,399,967 | A | | 8/1983 | Sandorff | 244/134 |
| 4,458,865 | A | | 7/1984 | Sandorff | 244/134 |
| 4,501,398 | A | | 2/1985 | Sandorff | 244/134 |
| 4,514,619 | A | | 4/1985 | Kugelman | 219/483 |
| 4,545,553 | A | | 10/1985 | Finke et al. | 244/134 |
| 4,629,149 | A | * | 12/1986 | Carson et al. | 244/134 R |
| 4,678,144 | A | | 7/1987 | Goehner et al. | 244/134 |
| 4,690,353 | A | | 9/1987 | Haslim et al. | 244/134 |
| 4,732,351 | A | * | 3/1988 | Bird | 244/134 D |
| 4,875,644 | A | | 10/1989 | Adams et al. | 244/134 |
| 4,894,569 | A | * | 1/1990 | Lardiere, Jr. et al. | 244/134 D X |
| 4,895,322 | A | * | 1/1990 | Zieve | 244/134 D X |

FOREIGN PATENT DOCUMENTS

| | | | | |
|---|---|---|---|---|
| GB | 505433 | | 5/1939 | |
| GB | 2106966 | * | 4/1983 | 244/134 D |
| SU | 361666 | * | 11/1983 | 244/134 D |

OTHER PUBLICATIONS

"Building Magnetics with Flexible Circuits," Feb. 1989, Powertechnics Mag., Vern Gregory.
AIAA '88 Electro–Impulse De–Icing A Status Report, Zumwalt.

(List continued on next page.)

*Primary Examiner*—William A. Cuchlinski, Jr.
*Assistant Examiner*—Edward J. Pipala
(74) *Attorney, Agent, or Firm*—Sughrue Mion, PLLC

(57) ABSTRACT

An attachable electro-impulse de-icer for de-icing an aircraft structural member includes an inductor coil disposed in proximity with the outer surface of the structural member. The coil is supported by a flexible, ice-accumulating support member (surface ply) that permits the coil to move relative to the structural member. Preferably the coil and support member are formed in an integral construction that can be attached to the leading edge of the structural member. The coil and support member are rapidly, and forcefully, displaced away from the structural member upon passing a short-duration, high-current pulse through the coil. The current flow creates an electromagnetic field that induces eddy currents in the support member (if made of metal), and the structural member (if made of metal). Upon collapse of the electromagnetic field in the coil the support member is pulled rapidly to its rest position adjacent the structural member. Alternative arrangements are provided wherein (1) a metal target is disposed in proximity with the outer surface of the coil, (2) a metal target is disposed in proximity with the outer surface of the structural member, and (3) an additional target (doubler) is attached to the inner surface of the structural member.

61 Claims, 14 Drawing Sheets

OTHER PUBLICATIONS

Electro–Impulse De–Icing Systems—Issues and Concerns for Certification Jan. 9–12, 1989, AIAA '89, FAA Technical Center—Charles Masters.
Developments in Expulsive Separation Ice Protection Blankets Jan. 9–12, 1989, AIAA '89, FAA Technical Center—J. Goldberg & B. Lardiere.
Electromagnetic Emissions from a Modular Low Voltage EIDI System Jan. 9–12, 1989, AIAA '89, FAA Technical Center—P. Zieve, B. Huffer & J Ng.
Electro–Expulsive DeIcing System—Nov. 7–10, 1988, NASA Ames Research Center.
Low Voltage Electro–Impulse De–Icer, AIAA '88, Jan. 11–14, 1988, Zieve et al.
Electro–Impulse De–Icing Electrodynamic Solution by Discrete Elements AIAA '88, Jan. 11–14, 1988, Bernhart and Schrag.
Test and Analysis of Electro–Impulse De–Icing Systems in Turbine Engine Inlets AIAA '88, Jan. 11–14, 1988, Nelepovitz, Rosenthal & Rockholt.
Analysis and Tests for Design of an Electro–Impulse De–Icing System, May, 1985, Zumwalt, Schrag, Bernhart and Friedberg.
Flight and Wind Tunnel Tests of an Electro–Impulse De–Icing System, Zumwalt and Mueller.
A Finite Element Study of the EIDI System, University of Akron, Khatkhate, Scavuzzo and Chu.

* cited by examiner

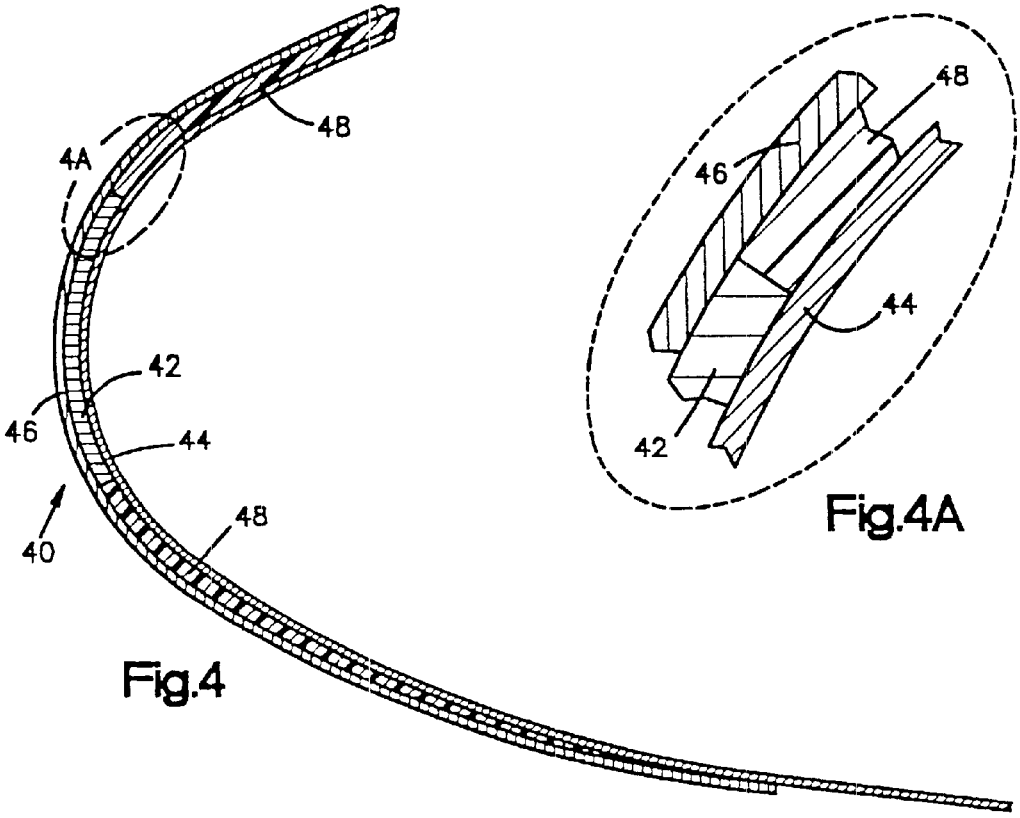
Fig.4
Fig.4A
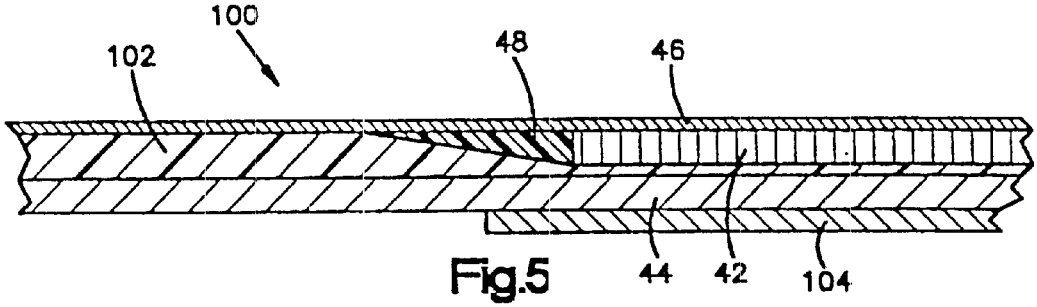
Fig.5
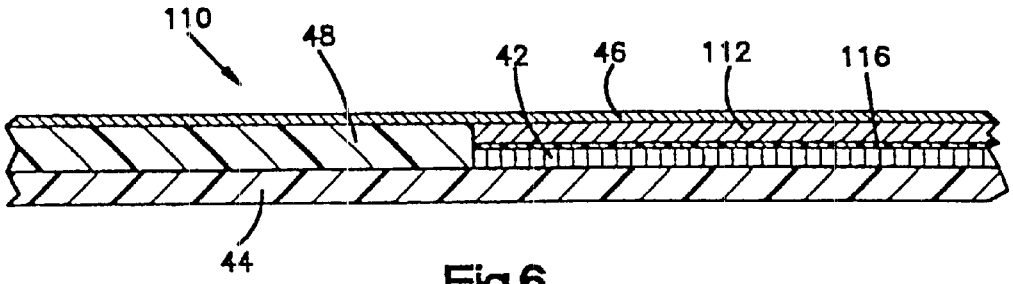
Fig.6

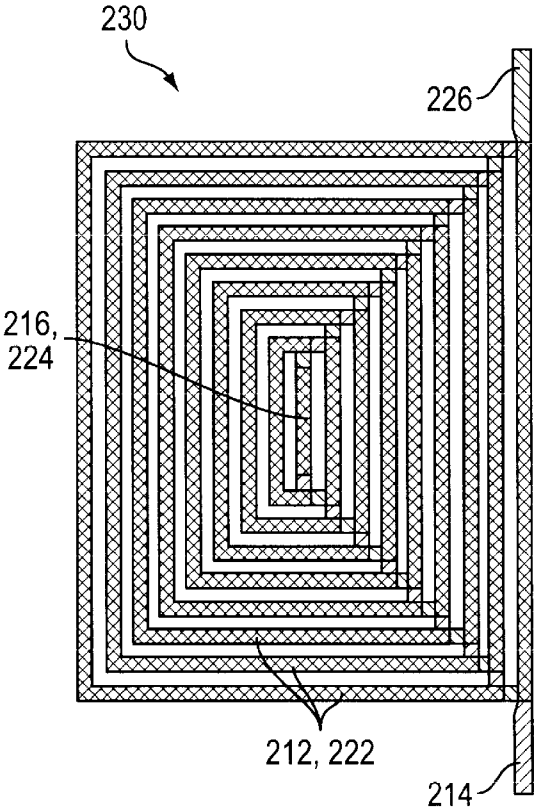
FIG. 29
(NEW)
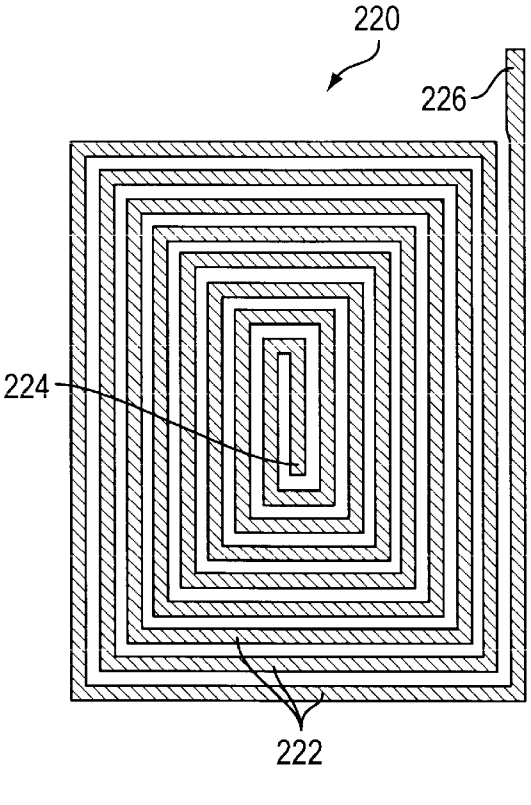
FIG. 28
(NEW)
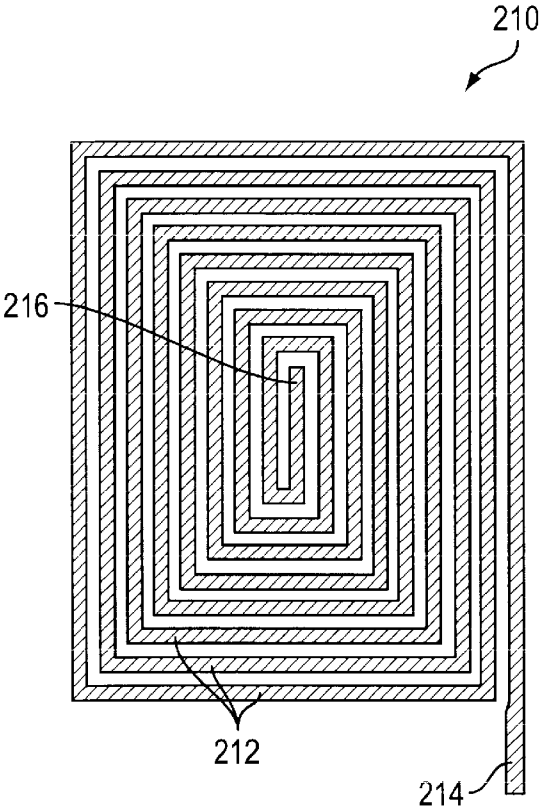
FIG. 27
(NEW)

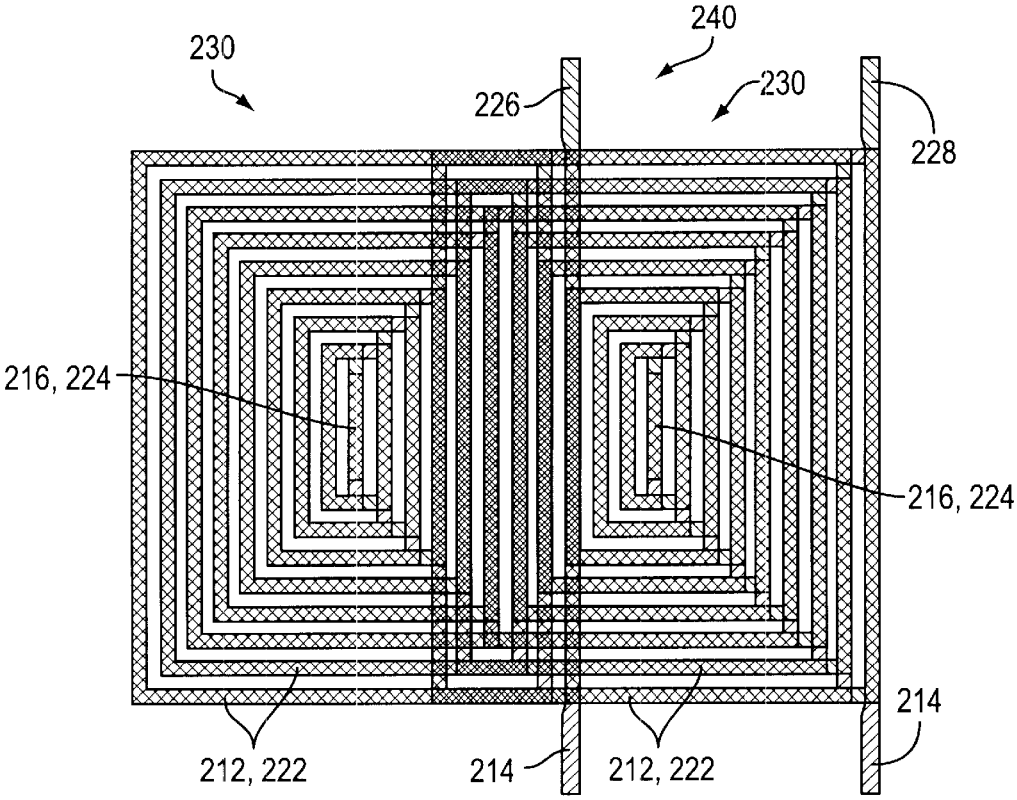
FIG. 30
(NEW)
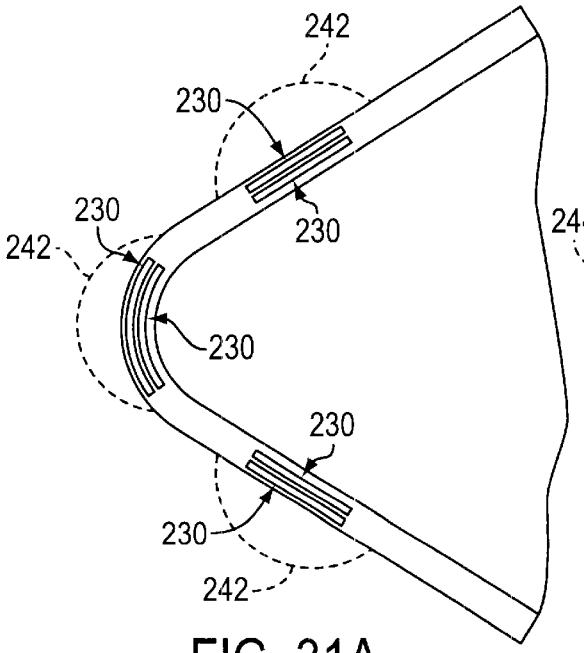
FIG. 31A
(NEW)
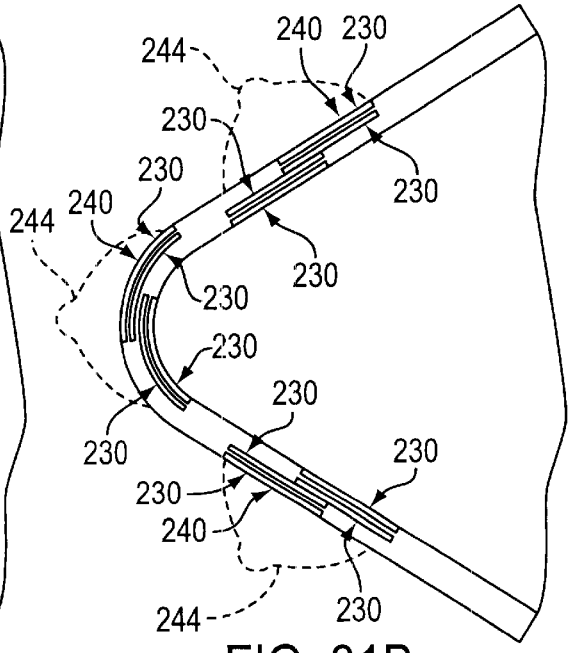
FIG. 31B
(NEW)

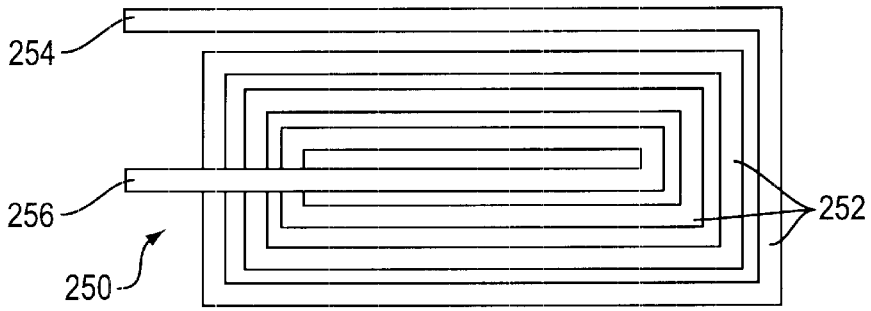
FIG. 32
(NEW)
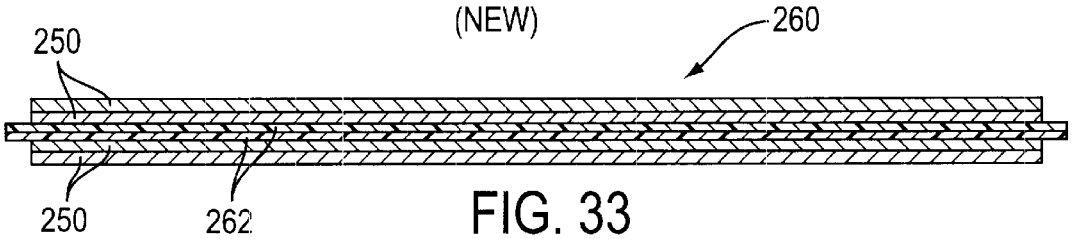
FIG. 33
(NEW)
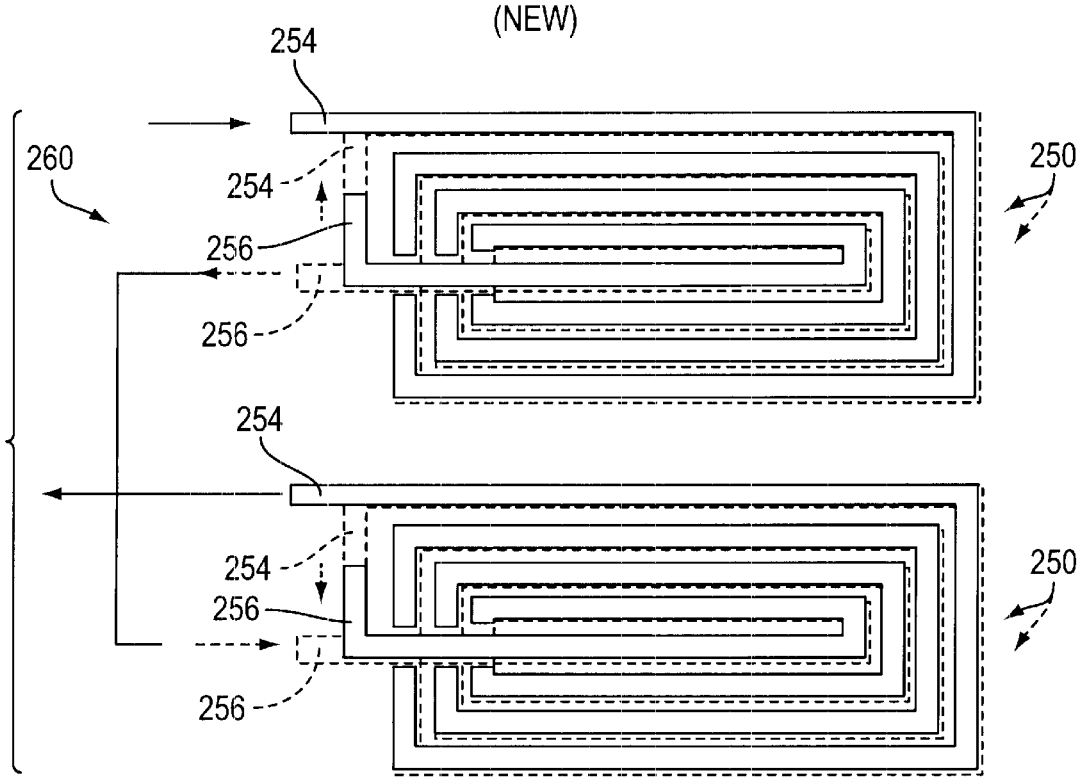
FIG. 34
(NEW)

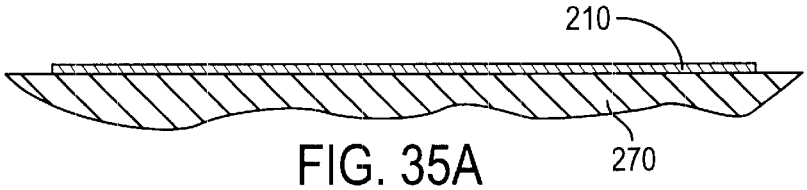
FIG. 35A
(NEW)
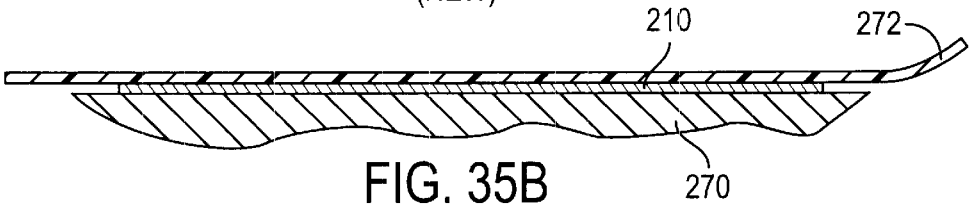
FIG. 35B
(NEW)
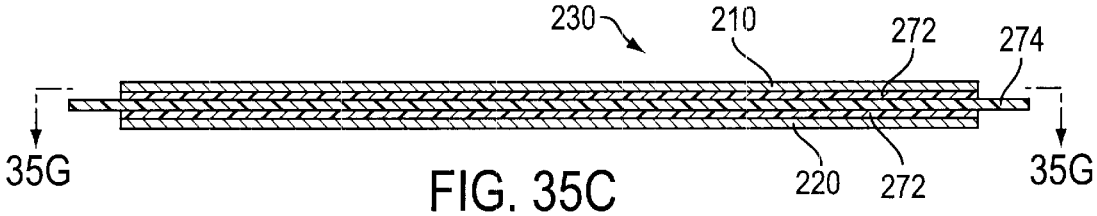
FIG. 35C
(NEW)
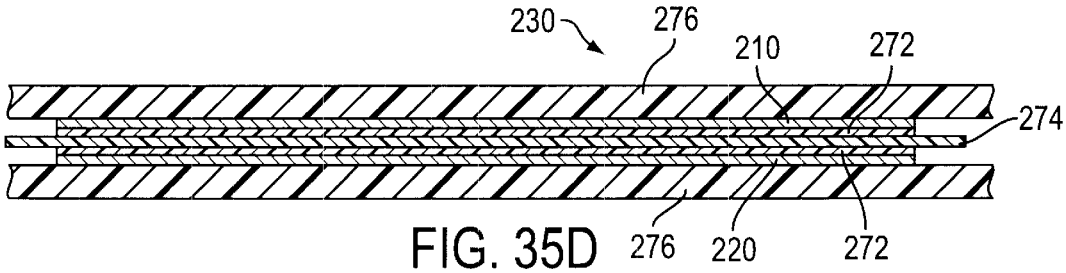
FIG. 35D
(NEW)
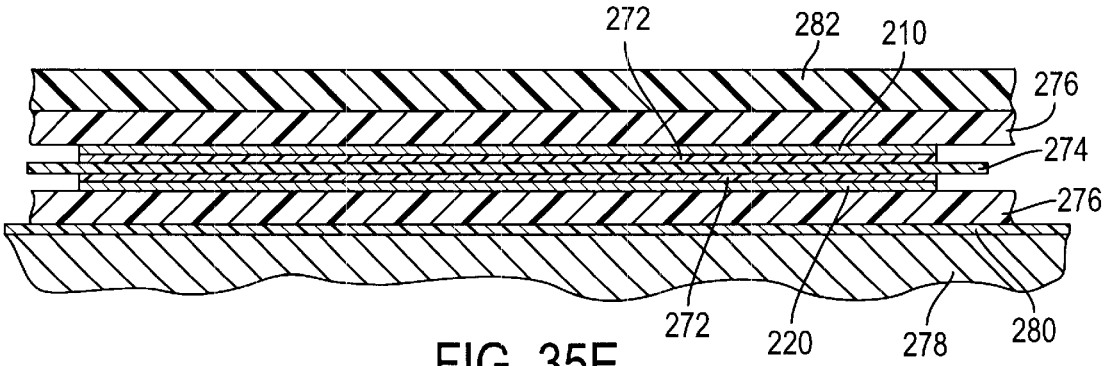
FIG. 35E
(NEW)

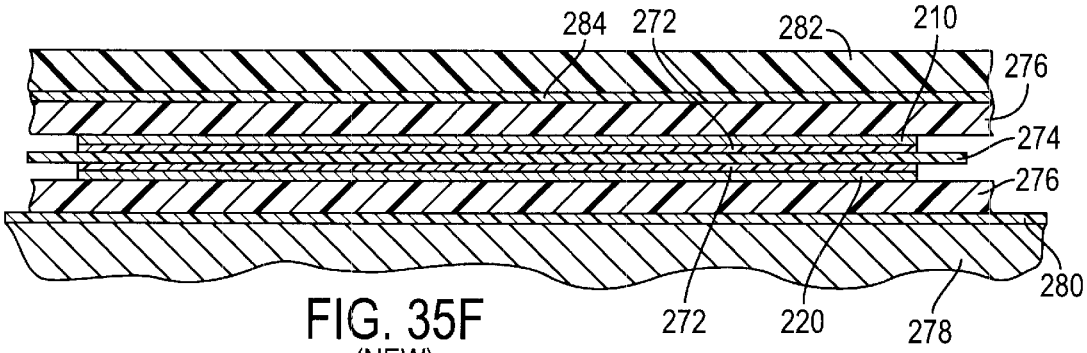
FIG. 35F
(NEW)
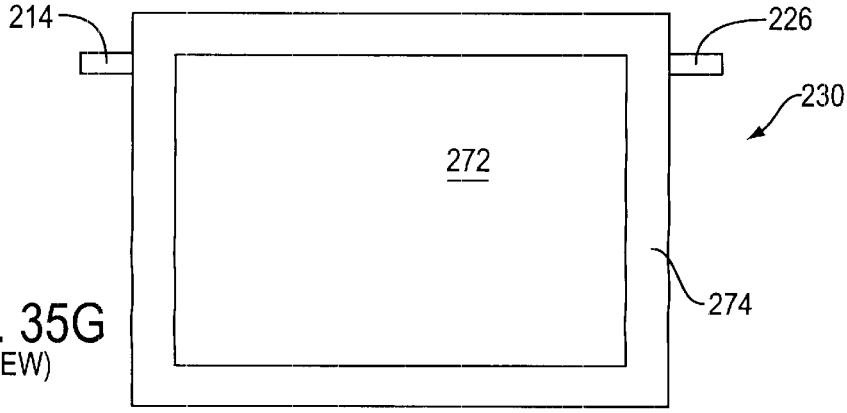
FIG. 35G
(NEW)
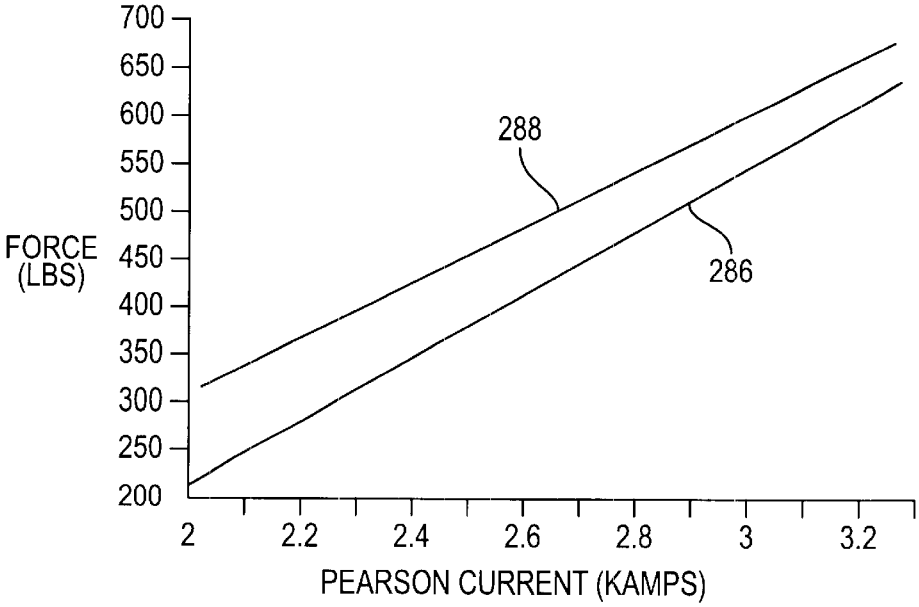
FIG. 36
(NEW)

ATTACHABLE ELECTRO-IMPULSE DE-ICER

Matter enclosed in heavy brackets [ ] appears in the original patent but forms no part of this reissue specification; matter printed in italics indicates the additions made by reissue.

BACKGROUND OF THE INVENTION

1. Cross-Reference to Related Patent

U.S. Pat. No. 4,875,644, issued Oct. 24, 1989, entitled "Electro-Repulsive Separation System for De-Icing," by Lowell J. Adams, et al., the disclosure of which is incorporated herein by reference (hereinafter referred to as the "Electro-Repulsive Separation System Patent").

2. Field of the Invention

The invention relates to de-icers for aircraft and, more particularly, to de-icers that operate by deforming ice-accumulating surfaces.

*The invention relates to planar coils and, more particularly, to planar coils especially adapted for use in a force-producing device such as a de-icer.*

3. Description of the Prior Art

The accumulation of ice on aircraft wings and other structural members in flight is a danger that is well known. As used herein, the term "structural members" is intended to refer to any aircraft surface susceptible to icing during flight, including wings, stabilizers, engine inlets, rotors, and so forth. Attempts have been made since the earliest days of flight to overcome the problem of ice accumulation. While a variety of techniques have been proposed for removing ice from aircraft during flight, these techniques have had various drawbacks that have stimulated continued research activities.

One approach that has been used extensively is so-called mechanical de-icing. In mechanical de-icing, the leading edges of structural members are distorted in some manner so as to crack ice that has accumulated thereon for dispersal into the airstream. A popular mechanical de-icing technique is the use of expandable tube-like structures that are periodically inflatable. Inflation of the structures results in their expansion or stretching by 40% or more. Such expansion typically occurs over approximately 2–6 seconds and results in a substantial change in the profile of the de-icer, thereby cracking accumulated ice. Unfortunately, expansion of the devices can negatively influence the airflow passing over the aircraft structure. Also, they are most effective when ice has accumulated to a substantial extent, approximately 0.25 inch or more, thereby limiting their effectiveness. Desirably, ice removal would be accomplished long before accumulations approximating 0.25 inch have been attained.

A more recent mechanical de-icing technique utilizes internal "hammers" to distort the leading edges of structural members. Such an approach is exemplified by U.S. Pat. No. 3,549,964 to Levin et al., wherein electrical pulses from a pulse generator are routed to a coil of a spark-gap pressure transducer disposed adjacent the inner wall of the structural member. The primary current in the coil induces a current in the wall of the structural member and the magnetic fields produced by the currents interact so as to deform the member.

U.S. Pat. Nos. 3,672,610 and 3,779,488 to Levin et al. and U.S. Pat. No. 4,399,967 to Sandorff disclose aircraft de-icers that utilize energized induction coils to vibrate or torque the surface on which ice forms. Each of these devices employs electromagnetic coils or magneto-restrictive vibrators located on the side of the surface opposite to that on which ice accumulates. In U.S. Pat. No. 3,809,341 to Levin et al., flat buses are arranged opposite one another, with one side of each bus being disposed adjacent an inner surface of an ice-collecting wall. An electric current is passed through each bus and the resulting interacting magnetic fields force the buses apart and deform the ice-collecting walls.

A more recent approach is shown by U.S. Pat. No. 4,690,353 to Haslim et al. In the '353 patent, one or more overlapped flexible ribbon conductors are imbedded in an elastomeric material that is affixed to the outer surface of a structural member. The conductors are fed large current pulses from a power storage unit. The resulting interacting magnetic fields produce an electro-expulsive force that distends the elastomeric member. The distension is almost instantaneous when a current pulse reaches the conductors, and is believed to be effective in removing thin layers of ice. Although the device disclosed in the '353 patent is believed to be an improvement over previous mechanical de-icing techniques, certain drawbacks remain. One of the drawbacks relates to the direction of current flow in adjacent electrically conductive members. It is believed that the current flow disclosed in the '353 patent produces inefficiencies that significantly restrict the effectiveness of the device.

The Electro-Repulsive Separation System Patent disclose a device that is an improvement over that disclosed in the '353 patent. In the Electro-Repulsive Separation System Patent, the electrically conductive members are arranged such that a greater electro-expulsive force can be generated than with the serpentine configuration disclosed in the '353 patent. Also, the Electro-Repulsive Separation System Patent teaches the delivery of a current pulse of predetermined magnitude, shape and duration that provides more effective de-icing action.

Despite the advances taught by the prior art, particularly the Electro-Repulsive Separation System Patent, there remains a need for a de-icer that provides effective de-icing action. In particular, it is desired to have a de-icer that has the force-generating capabilities of various prior mechanical de-icers without the drawbacks associated therewith, such as large size, difficulty in retrofitting existing structural members, and other problems.

*The accumulation of ice on aircraft wings and other structural members in flight is a danger that is well known. As used herein, the term "structural members" is intended to refer to any aircraft surface susceptible to icing during flight, including wings, stabilizers, engine inlets, rotors, and so forth. Attempts have been made since the earliest days of flight to overcome the problem of ice accumulation. While a variety of techniques have been proposed for removing ice from aircraft during flight, these techniques have had various drawbacks that have stimulated continued research activities.*

*One approach that has been used extensively is so-called mechanical de-icing. In mechanical de-icing, the leading edges of structural members are distorted in some manner so as to crack ice that has accumulated thereon for dispersal into the airstream. A popular mechanical de-icing technique is the use of expandable tube-like structures that are periodically inflatable. Inflation of the structures results in their expansion or stretching by 40% or more. Such expansion typically occurs over approximately 2–6 seconds and results in a substantial change in the profile of the de-icer, thereby cracking accumulated ice. Unfortunately, expansion of the devices can negatively influence the airflow passing over the*

*aircraft structure. Also, they are most effective when ice has accumulated to a substantial extent, approximately 0.25 inch or more, thereby limiting their effectiveness. Desirably, ice removal would be accomplished long before accumulations approximately 0.25 inch have been attained.*

*A more recent mechanical de-icing technique utilizes internal "hammers" to distort the leading edges of structural members. Such an approach is exemplified by U.S. Pat. No. 3,549,964 to Levin et al., wherein electrical pulses from a pulse generator are routed to a coil of a spark-gap pressure transducer disposed adjacent the inner wall of the structural member. The primary current in the coil induces a current in the wall of the structural member and the magnetic fields produced by the currents interact so as to deform the member.*

*U.S. Pat. Nos. 3,672,610 and 3,779,488 to Levin et al. and U.S. Pat. No. 4,399,967 to Sandorff disclose aircraft de-icers that utilize energized induction coils to vibrate or torque the surface on which ice forms. Each of these devices employs electromagnetic coils or magneto-restrictive vibrators located on the side on the surface opposite to that on which ice accumulates. In U.S. Pat. No. 3,809,341 to Levin et al., flat buses are arranged opposite one another, with one side of each bus being disposed adjacent an inner surface of an ice-collecting wall. An electric current is passed through each bus and the resulting interacting magnetic fields force the buses apart and deform the ice-collecting walls.*

*A more recent approach is shown by U.S. Pat. No. 4,690,353 to Haslim et al. In the '353 patent, one or more overlapped flexible ribbon conductors are imbedded in an elastomeric material that is affixed to the outer surface of a structural member. The conductors are fed large current pulses from a power storage unit. The resulting interacting magnetic fields produce an electro-expulsive force that distends the elastomeric member. The distension is almost instantaneous when a current pulse reaches the conductors, and is believed to be effective in removing thin layers of ice. Although the device disclosed in the '353 patent is believed to be an improvement over previous mechanical de-icing techniques, certain drawbacks remain. One of the drawbacks relates to the direction of current flow in adjacent electrically conductive members. It is believed that the current flow disclosed in the '353 patent produces inefficiencies that significantly restrict the effectiveness of the device.*

*The Electro-Repulsive Separation System Patent discloses a device that is an improvement over that disclosed in the '353 patent. In the Electro-Repulsive Separation System Patent, the electrically conductive members are arranged with current flow in a common direction in a conductor layer such that a greater electro-expulsive force can be generated than with the serpentine configuration disclosed in the '353 patent. Also, the Electro-Repulsive Separation System Patent teaches the deliver of a current pulse of predetermined magnitude, shape and duration that provides more effective de-icing action.*

*Despite the advances taught by the prior art, particularly the Electro-Repulsive Separation System Patent, there remains a need for a de-icer that provides effective de-icing action. A particular concern relates to the electrically conductive members that are used with the prior devices. It is desired to provide coils that are as thin as possible, while being relatively inexpensive and easy to manufacture. Desirably, any such coils would have a very high efficiency, that is, they would generate more force than prior electrically conductive members for a given current input. The coils also desirably would permit a small or large area of force production as desired for a de-icer construction.*

SUMMARY OF THE INVENTION

The present invention overcomes the foregoing drawbacks of the prior art and provides a new and improved de-icer especially adapted for attachment to external surfaces of structural members. In one embodiment of the present invention, an inductor coil is positioned in proximity with the outer surface of a structural member. The coil has a first side that is disposed in contact with the surface and a second side that is spaced from the surface. The coil is movable away from and toward the surface. A support member is provided for the coil, the support member being flexible in order to permit the coil to move relative to the surface. A portion of the support member defines an ice-accumulating surface that moves in response to movement of the coil. Preferably, the coil and support member are provided in an integral construction that can be bonded or otherwise attached to the leading edge of the structural member without modifying the structural member.

An alternative embodiment of the invention calls for providing a metal target that is disposed intermediate the coil and the support member. Another alternative embodiment calls for disposing the target intermediate the coil and the structural member. Yet an additional alternative embodiment calls for providing a target (doubler) that is attached to the inner surface of the structural member.

With each embodiment of the invention, the support member is rapidly, and forcefully, displaced away from the structural member upon passing a short-duration, high-current pulse through the coil. If the structural member is metal, the structural member functions as a target and the coil is displaced away from the surface; if the structural member is non-metal (such as a composite material), and if a surface-contacting target is not used, the coil remains positioned against the surface. The current flows creates an electromagnetic field that induces eddy currents in the target, structural member (if metal), and support member (if metal). Upon collapse of the electromagnetic field in the coil, the support member is pulled rapidly to its rest position.

In contrast with prior mechanical de-icers, the de-icer according to the invention is exceedingly effective, while avoiding many of the drawbacks of the prior art. Most of the forces that are applied to the structural member are compressive forces that are more easily accommodated than tensile forces that are produced by various other mechanical de-icers. Further, the device can be fitted readily to structural members, either as part of new construction or as a retrofit.

Because the device operates on an eddy current principle, it completely avoids problems arising from directional current flow, and it provides a more effective ice-shedding action than has been possible with previous devices. In part, the effectiveness of the device is enhanced because the ice-accumulating surface is displaced a relatively great distance at a high rate of acceleration. Although the displacement is not enough to negatively affect the airflow passing over the structural member, the displacement is more than 20 times greater than the displacement that occurs with such devices as are disclosed in prior eddy current-type de-icers. The device also produces about 20% greater eddy current induction than prior internally disposed eddy current de-icers because the coil and the target are in surface-to-surface contact with each other, or nearly so. The referenced internally disposed de-icers require a substantial gap between the coil and the target are in surface-to-surface contact with each other, or nearly so. The referenced internally disposed de-icers require a substantial gap between the coil and the structural member in order to prevent possible damage to the coil upon rebounding of the structural member. The efficiency of the present invention also is great because the ice-accumulating surface that is displaced is relatively thin and is resiliently mounted to the structural member. In those de-icers that distort the structural member itself, the ice-accumulating surface is relatively thick and may be relatively difficult to distort.

The foregoing and other features and advantages of the present invention will become more apparent when viewed in light of the description of the best embodiment of the invention and the drawings that follow, which together form a part of the specification.

*The present invention addresses the foregoing concerns and provides a new and improved planar coil construction especially adapted for use as part of a de-icer. The planar coil according to the invention includes a first sheet-like member defined by a first, continuous, electrical conductor having a plurality of turns and first and second ends. The first end of the first conductor defines an electrical input to the coil, and the second end of the first conductor defines an electrical output. The invention includes a second sheet-like member defined by a second, continuous, electrical conductor having a plurality of turns and first and second ends. The first end of the second conductor defines an electrical input, and the second end of the second conductor defines an electrical output from the coil. The second end of the first conductor and the first end of the second conductor are electrically connected. The first and second sheet-like members are disposed parallel to each other with the turns of the first and second conductors being positioned adjacent each other. The direction of current flow through the turns of the first conductor can be arranged to be substantially the same as that through the turns of the second conductor, or it can be arranged to be substantially opposite that through the turns of the second conductor. In addition, within a sheet-like member the adjacent conductors from the center out have current flow in the same direction, which is of particular importance for electro-repulsive force de-icers.*

*In one embodiment of the invention, the turns are rectangular, while in other embodiments the turns are spiral-shaped, square, or any other desired geometry. The invention also includes a technique for separating the sheet-like members by a dielectric layer, as well as a means for encapsulating the sheet-like members. Additional sheet-like members can be provided, if desired, and connected to each other and to the first and second sheet-like members. When more than two members are used, if the direction of current flow in a given layer is opposite to the direction of current flow in adjacent layers, a strong repulsive force is created when a high current pulse is applied. If the direction of current flow in a given layer is in the same direction as in adjacent layers, it may be used for an eddy current de-icer. The invention also contemplates incorporating a ferromagnetic or paramagnetic material (hereinafter referred to as "magnetic material") on the outer and/or inner surface of the coil in order to improve or shape the magnetic field generated by the coil and increase the resultant force.*

*Regardless of the embodiment of the invention that is utilized, the sheet-like members can be manufactured readily from metal foil or a flat-braided conductor. The coil according to the invention can be assembled readily, and it provides significant force-generating capabilities compared with prior coil constructions.*

*The foregoing and other features and advantages of the present invention will become more apparent when viewed in light of the description of the best embodiment of the invention and the drawings that follow, which together form a part of the specification.*

DESCRIPTION OF THE DRAWINGS

FIG. 4 is a cross-sectional view of a de-icer according to the invention attached to the outer surface of a structural member;

FIG. 4A is an enlarged cross-sectional view of a portion of the de-icer shown in FIG. 4.

FIG. 5 is a cross-sectional view of an alternative embodiment of the invention shown in FIG. 4 illustrating another technique for attaching the de-icer to the outer surface of a structural member;

FIG. 6 is a cross-sectional view of an alternative embodiment of the invention showing a metal target used in conjunction with a coil;

*FIG. 27 is a plan view of a sheet-like member formed of a continuous electrical conductor that is usable with the present invention;*

*FIG. 28 is a view similar to FIG. 27, showing another sheet-like member;*

*FIG. 29 is a view similar to FIG. 27, showing the sheet-like members of FIGS. 27 and 28 completely superimposed;*

*FIG. 30 is a view similar to FIG. 29, showing a first superimposed pair of sheet-like members partially superimposed with respect to a second pair of superimposed sheet-like members;*

*FIGS. 31A and 31B are schematic cross-sectional views of planar coils according to the invention as they might be used in a de-icer;*

*FIG. 32 is a plan view of an alternative embodiment of the sheet-like member of FIG. 27;*

*FIG. 33 is schematic, cross-sectional view of an assembled coil construction employing four superimposed sheet-like members;*

*FIG. 34 is a plan view of the coil construction of FIG. 34, with the sheet-like members displaced relative to each other for clarity in illustrating the directions of current flow;*

*FIGS. 35A–35F are cross-sectional views similar to FIG. 33 showing how planar coils according to the invention can be assembled for use as a force-producing element as part of a de-icer;*

*FIG. 35G is a cross-sectional view of the coils of FIGS. 35A–35F taken along a plane indicated by line 35G—35G in FIG. 35C; and*

*FIG. 36 is a plot of force versus current for coils as illustrated in FIGS. 33 and 34.*

DETAILED DESCRIPTION OF THE INVENTION

The present invention provides a technique especially adapted for de-icing the leading edges of structural members. De-icing is the removal of ice subsequent to its formation upon a leading edge. A leading edge is that portion of a structural member that functions to meet and break an airstream impinging upon the surface of the structural member. Examples of leading edges are the forward portions of wings, stabilizers, struts, nacelles, rotors, and other housings and protrusions first impacted by an airstream.

Figure 1:
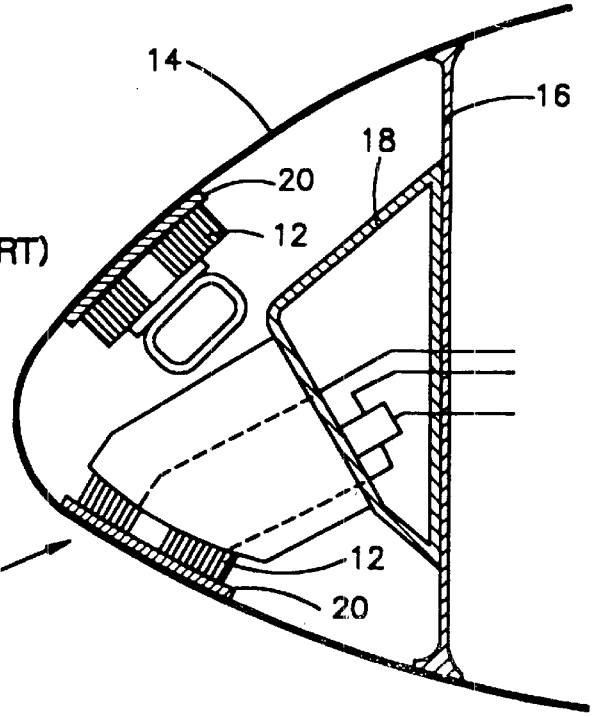
Fig.1 (PRIOR ART)
FIG. 1 is a schematic, cross-sectional view of a prior art mechanical de-icer.
Figure 2:
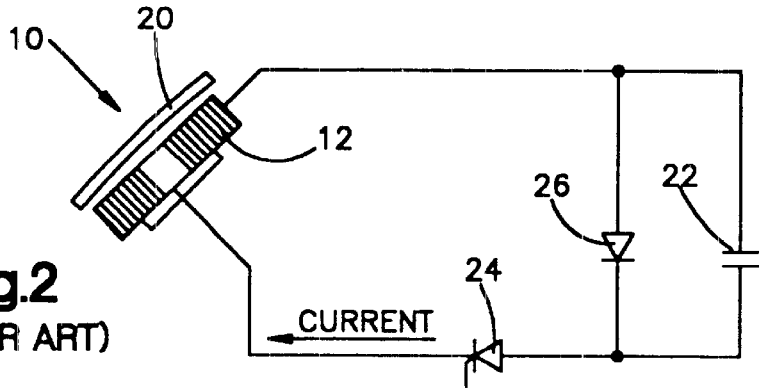
Fig.2 (PRIOR ART)
FIG. 2 is a schematic electrical circuit showing how the de-icer of FIG. 1 is activated.
Figure 3:
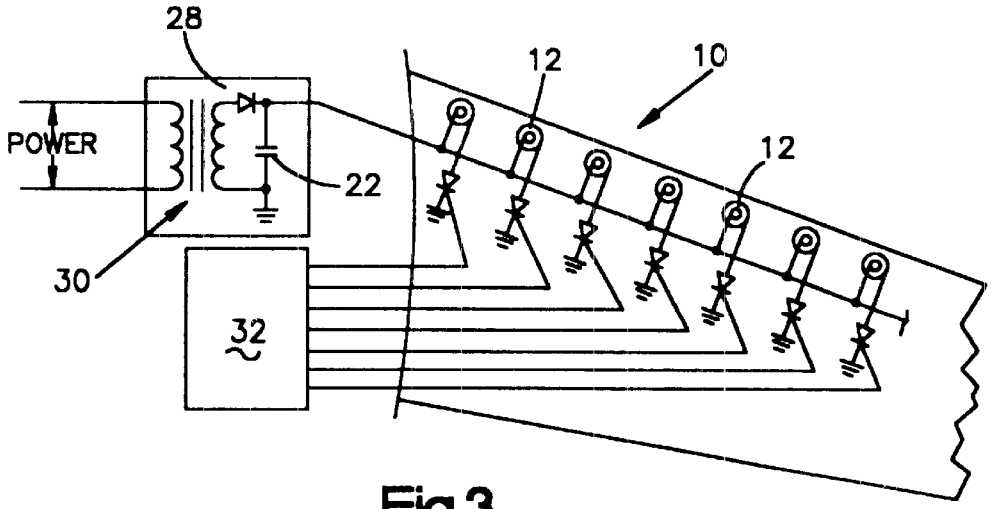
Fig.3 (PRIOR ART)
FIG. 3 is a schematic electrical circuit showing how a plurality of de-icers according to FIG. 1 can be installed in a structural member.

FIGS. 1–3 illustrate a known mechanical de-icer 10 and electrical circuitry thereof. The de-icer 10 includes first and second coils 12 that are disposed with a structural member (such as a wing) 14 near the backside of the leading edge thereof. The surface of the structural member 14 is made of metal such as aluminium which will be referred to as the "skin." The coils 12 are mounted to a spar 16 by means of a mounting bracket 18. The coils 12 are circular in plan view. A circular, unalloyed aluminium disk 20 is bonded to the inner surface of the leading edge directly opposite each of the coils 12.

Referring to FIG. 2, each coil 12 is connected in series with an energy storage capacitor 22 and a thyristor 24. A diode 26 is connected in parallel with the capacitor 22. An electrical impulse is initiated by supplying a trigger pulse to the thyristor 24, allowing the capacitor 22 to discharge through the coil 12. Because the thyristor 24 has diode properties, the current follows the first positive loop of the RLC response, after which the thyristor 24 reopens the circuit. This leaves the capacitor 22 reverse-charged. Such reverse-charging reduces capacitor life substantially. For that reason, the diode 26 is placed across the capacitor 22.

Referring to FIG. 3, a typical spanwise installation of the coils 12 within a wing is shown. Each of the coils 12 is separated laterally from other coils 12 by about 16 inches. The coils 12 are supplied a single power unit 28 that includes a transformer 30. The capacitor 22 is connected across the secondary side of the transformer 30. A switching device 32 is connected to each of the thyristors 24 in order to provide a trigger pulse to the thyristors 24.

When the capacitor 22 is discharged through each coil 12, a rapidly forming and collapsing electromagnetic field is created that induces eddy currents in the disk 20 and the metal skin 14. The electromagnetic fields resulting from current flow in the coil 12, the disk 20, and the skin 14 create a repulsive force of several hundred pounds magnitude, but with a duration of only a fraction of a millisecond. A small amplitude, high acceleration movement of the skin 14 acts to shatter, debond, and expel the ice. Two or three such "hits" are performed in short order, separated by the time required to recharge the capacitor 22, and then ice is permitted to accumulate again until it approaches an undesirable thickness. By appropriate control of the switching device 32 the coils 12 can be activated sequentially in order to create a "ripple" effect that is believed to be more effective in shedding ice due to the propogation of skin movement in both chordwise and spanwise directions.

As will be appreciated from the foregoing description, the referenced de-icer 10 depends for its effectiveness upon deformation of the skin. The displacement of the metal surface subject to icing is very limited; typically it requires three impact pulses to remove accumulated ice under all icing conditions. Further, although the skin is displaced only to a limited extent, it is necessary to produce high forces in order to accomplish even that limited displacement. An additional problem is that the forces are "negative" forces in that they apply a tensile load to the leading edge. Aircraft structural members are designed to better withstand compressive loads, rather than tensile loads.

Referring now to FIG. 4, a de-icer according to the invention is indicated by the reference numeral 40. The de-icer 40 is similar to the de-icer 10 in that it employs a coil 42. However, as will be discussed below, the de-icer 40 differs significantly from the de-icer 10. The differences will be apparent from the description that follows.

The de-icer 40 as shown in FIG. 4 is formed in an integral unit that is bonded or otherwise securely attached to the leading edge of a structural member. The leading edge, or skin, of the structural member is indicated by the reference numeral 44. Typically the skin 44 will be made of metal such as an aluminium alloy. The coil 42 normally will be a multi-layer coil comprised of individual planar coil elements (see the discussion that follows with respect to FIGS. 9–11). In all of the embodiments described herein, the coil 42 is a unitary structure that has no portions that move relative to each other. For purposes of the present discussion, the coil 42 will be indicated schematically as a single element. The coil 42 includes a first surface that at rest is in contact with the exterior surface of the skin 44, and a second surface that is spaced from the skin 44. The coil 42 is not bonded to the skin 44, so that it can move away from and toward the skin 44.

The second surface of the coil 42 is covered by a surface ply 46. The surface ply 46 preferably is not bonded to the second surface of the coil 42. The lateral edges of the coil 42 are abutted by a flexible, non-metallic filler layer 48 in order to provide a smooth transition with the contour of the skin 44. The de-icer 40 is bonded or otherwise securely attached to the skin 44 by means of the layer 48. The surface ply 46 is bonded to the layer 48. At the ends of the surface ply 46, the surface ply 46 is bonded or attached by a fastener (not shown) to the skin 44. Accordingly, the coil 42 and the surface ply 46 are able to move away from, and toward, the skin 44 intermediate the portions of the layer 48 that are bonded to the skin 44. It will be apparent from an examination of FIG. 4 that the surface ply 46 not only forms a major portion of the exterior surface of the de-icer 40, but it also functions as a support member for the coil 42 (together with the layer 48) so as to keep the coil 42 properly positioned relative to the skin 44.

The coil 42 preferably is made of unalloyed copper. Reference is made to U.S. application Ser. No. 07/437,489, filed Nov. 15, 1989, Lowell J. Adams et al., entitled "Planar Coil Construction," [the disclosure of which is incorporated herein by reference,] for a more complete description of the coil 42 and how it is manufactured. The surface ply 46 can be manufactured from any suitable metal commonly used for the exterior surfaces of structural members, such as aluminum, titanium or stainless steel foil. The surface ply 46 also could be made from a thin layer of thermoplastic film such as polyetherether ketone ("PEEK"). Such a material has excellent rain erosion characteristics, while being readily formed to any desired shape. The ply 46 can be made from other suitable non-metal materials, if desired. The adhesive used to bond the surface ply 46 to the layer 48 can be any adhesive commonly used to join surface plys to other parts of de-icers, although a modified epoxy film adhesive such as EA951 (manufactured by Hysol Corporation) is preferred. The filler layer 48 can be made of any known flexible, non-metallic material used with de-icers such as rubber, fiberglass, and the like.

Figure 16:
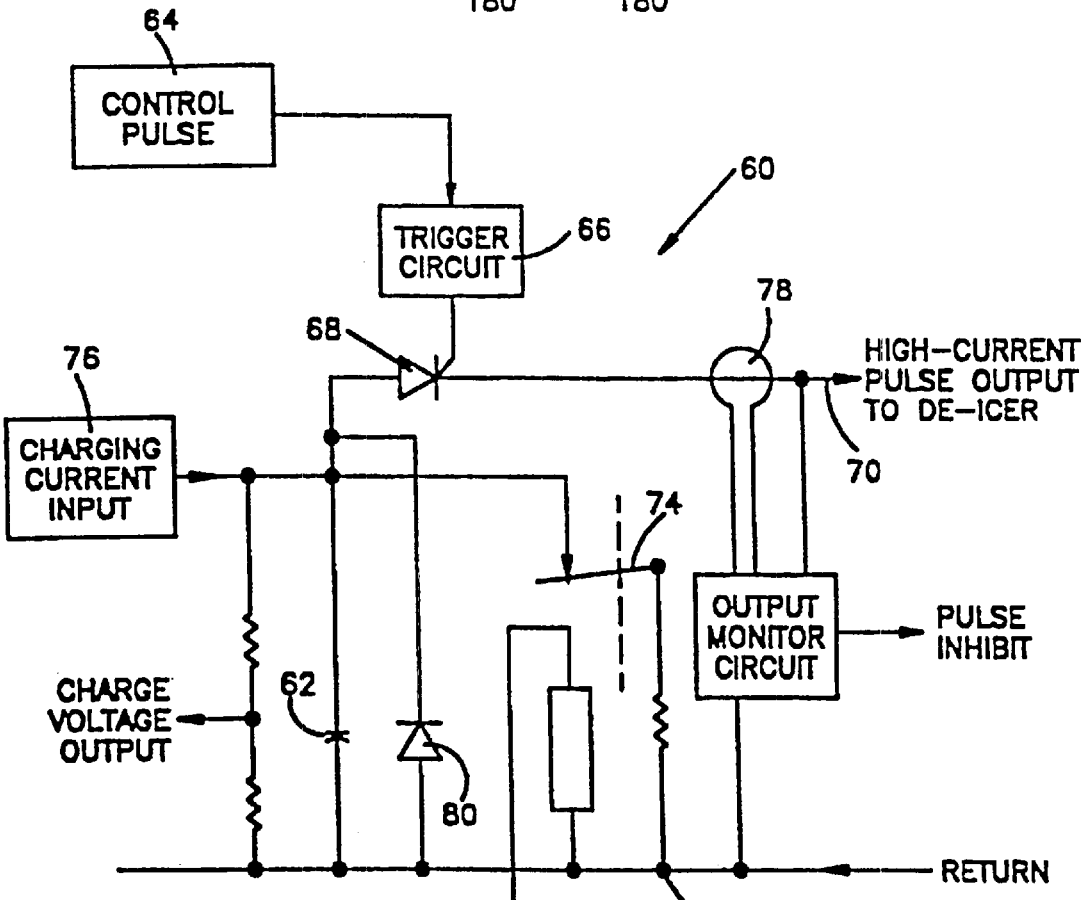
FIG. 16 is a schematic electrical circuit diagram for a de-icer according to the invention.

Referring now to FIG. 16, a schematic electrical circuit for the de-icer 40 is indicated by the reference numeral 60. The circuit 60, with minor modifications, is described in detail in the Electro-Repulsive Separation System Patent. The circuit 60 charges a bank of capacitors 62 (only one is illustrated for simplicity) which serve as high-voltage energy storage devices. The metal surface ply 46 and any target or doublers, if used, should be connected to the aircraft ground in order to minimize electromagnetic interference. When de-icing action is desired, a control pulse 64 is fed to a trigger circuit 66 which enables discharge of the capacitor 62 through one or more silicon controlled rectifiers (SCR's) 68 to provide a high-current pulse output 70 to the coil 42. Whenever an output current pulse 70 is desired, a dump load 72, which maintains the capacitors 62 in a discharged condition, is removed by opening a switch 74, thereby allowing charging current from a charging circuit 76 to charge the capacitors 62 to the desired voltage. When the SCR 68 is triggered "on," the capacitor bank 62 is discharged into the coil 42. A high-current pulse is produced, the magnitude of which is monitored by means of a current transformer 78.

Figure 17:
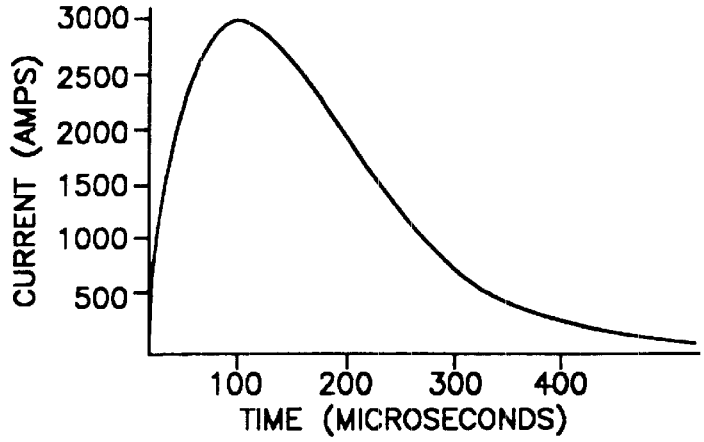
FIG. 17 is a plot of current versus time showing the profile of a current pulse used with the present invention.

Referring to FIG. 17, the current pulse may be a clean overdamped exponentially decaying sinusoidal waveform that is achieved by the RLC electrical circuit values. In the event that the component values of the RLC circuit are selected in a known manner such that the circuit may be or become underdamped or oscillatory in nature, the circuit should be configured such that a rectifier 80 dumps the stored energy of the circuit inductance into the de-icer load, producing a single, non-oscillatory pulse having an extended trailing edge.

If the capacitor 62 has a capacitance of about 500 microfarads, and if the circuit 60 is operated as described previously, a current flow having a peak value of about 3000 amps at 1250 volts will be discharged through the coil 42. The coil rise time will be about 100 microseconds and the decay time will be about 200–300 microseconds. A strong electromagnetic field will be generated that will induce eddy currents in the skin 44 and the surface ply 46 (if metal). In turn, electromagnetic fields will be generated by the skin 44 and the surface ply 46. The electromagnetic fields thus generated will create a large repulsive force having a duration of only a fraction of a millisecond. The impact force will be transferred by the coil 42 to the surface ply 46, creating a small-amplitude, high-acceleration movement of the surface ply 46 that will be sufficient to break up and shed any ice that has accumulated.

Figure 18:
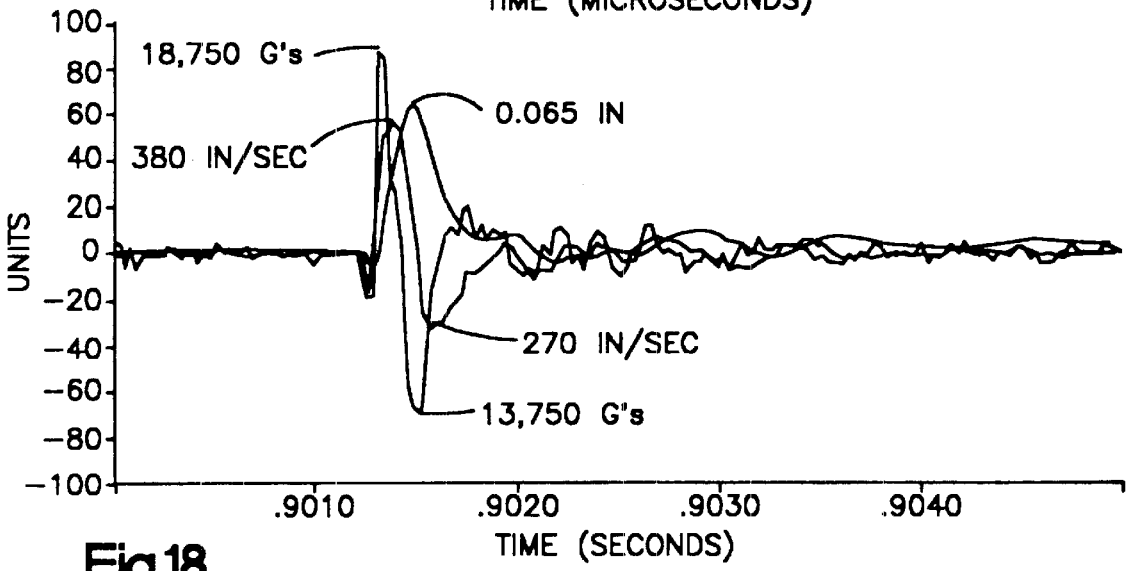
FIG. 18 is a plot of displacement, velocity and acceleration versus time showing the movement of a portion of the de-icer according to the invention.

Referring now to FIG. 18, a plot of displacement, velocity and acceleration for the surface ply 46 is shown. As shown in FIG. 18, the surface ply 46 is displaced about 0.065 inch, with a peak acceleration of about 18,750 times the acceleration due to gravity (G's) and with a peak velocity of about 380 inches per second. The compressive and expansion forces that are generated are reversed during collapse of the electromagnetic fields, thereby producing a pressure wave across the surface ply 46. The coil 42 and the surface ply 46 are rapidly pulled to the rest position shown in FIG. 4. As can be seen from an examination of FIG. 18, the peak retraction velocity is about 270 inches per second, and the peak acceleration is about 13,750 G's. In effect, the coil 42 and the surface ply 46 not only are repulsed from the skin 44, but they also are powered back toward the skin 44. As can be seen from an examination of FIG. 18, there is minimal "bouncing" of the coil 42 and the surface ply 46 upon retraction against the skin 44. It also will be appreciated that the initial displacement of the coil 42 and the surface ply 46 away from the skin 44 apply primarily compressive loads to the skin 44, rather than tensile loads.

Figure 19:
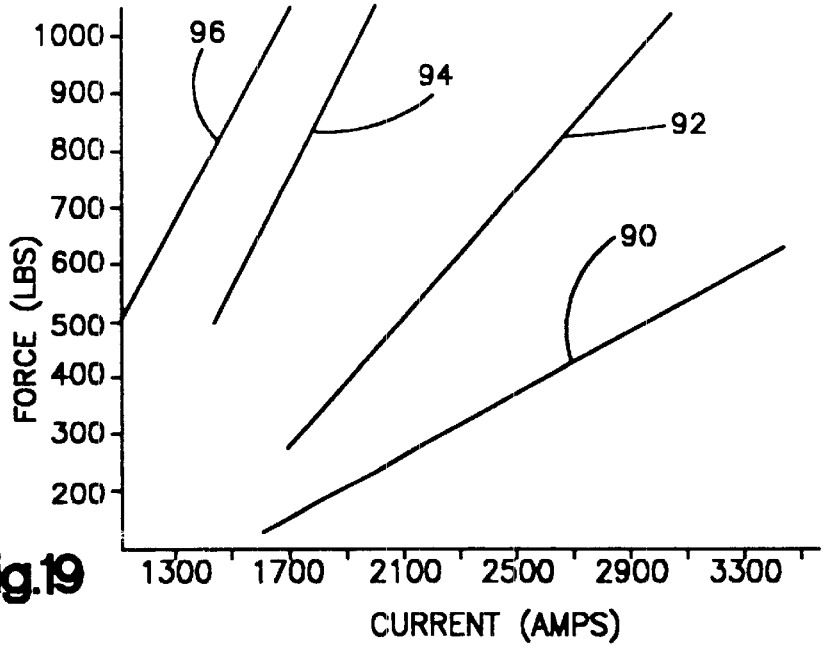
FIG. 19 is a graph of force versus coil current showing the performance of a de-icer in accordance with the present invention compared with prior art mechanical de-icers.

Referring now to FIG. 19, a plot of force versus coil current is shown for a laboratory force vice test. Four test results are shown. The lines bearing the reference numerals 90, 92, 94 are plots of force versus current for coils operating on the so-called electro-repulsive principle disclosed in the Electro-Repulsive Separation System Patent. The line labeled 96 is a plot of force versus current for a coil 42 operating according to the invention. Line 90 was generated using a four-layer serpentine coil. The line labeled 92 is a plot of the results utilizing a four-layer flat coil etched from rectangular sheets of copper. The line bearing the reference numeral 94 is a plot of the results utilizing a four-layer planar coil etched from square sheets of copper. The line bearing the reference numeral 96 is a plot of the results using a four-layer, planar, rectangular coil 42 operated according to the invention. As can be seen from reviewing FIG. 19, the invention produced markedly superior results compared with any prior coils tested. The results were particularly dramatic compared with flat serpentine coils (line 90). At a coil current of 1700 amps, the planar coil 42 generated well over 1000 pounds of repulsive force, whereas the serpentine coil generated less than 200 pounds of repulsive force.

Alternative embodiments of the invention are illustrated in FIGS. 5–8. These alternative embodiments will be described in order. Where appropriate, reference numerals that designate elements common to the various embodiments will be carried over from Figure-to-Figure.

Referring to FIG. 5, an alternative embodiment of the invention is indicated by the reference numeral 100. The de-icer 100 employs an attachment layer 102 that is bonded or otherwise securely attached to a metal skin 44 in substantial surface-to-surface contact. An additional target 104 (a so-called "doubler") can be disposed on the inner surface of the skin 44, if desired. It is advantageous to use the target 104 if the metal skin 44 is not thick enough to induce adequate eddy currents. The coil 42 is disposed on the outer side of the layer 102. The coil 42 is not bonded to the layer 102 so that the coil 42 can move away from, and toward, the layer 102. The surface ply 46 covers both the coil 42 and the layer 102. The filler layer 48 (only a portion of which is shown) provides a smooth contour with the skin 44 as in the embodiment described in FIG. 4. It is expected that the layer 102 will be made of a non-metal material such as adhesive film, fiberglass, and the like.

An advantage of the de-icer 100 is that the de-icer 100 can be manufactured as a prefabricated, integral unit for subsequent attachment to the skin 44. It is believed that the de-icer 100 will be easier to attach to the skin 44 than the de-icer 40. Further, because the layer 102 is attached to the skin 44 in substantial surface-to-surface contact, the attachment between the de-icer 100 and the skin is exceedingly strong.

Referring to FIG. 6, another alternative embodiment of the invention is indicated by the reference numeral 110. The de-icer 110 is similar to the de-icer 40, both in structure and operation, except that a metal target 112 is disposed on the second side of the coil 42, intermediate the coil 42 and the surface ply 46. The filler layer 48 is bonded to the skin 44 in substantial surface-to-surface contact, but the coil 42 is not bonded to the skin 44 so that it can move away from, and toward, the skin 44. It is expected that the skin 44 in the embodiment shown in FIG. 6 will be made of a metal or composite material. The target 112 preferably is bonded to the ply 46 by an adhesive such as EA951. The coil 42 and the target 112 are separated by a thin separation ply, or release layer 116. The layer 116 enables the target 112 to move away from, and toward, the coil 42. It is expected that the target 112 will be made of a paramagnetic material such as aluminum. The release layer 116 can be made of a non-stick, thermoplastic material. A suitable material for the layer 116 is commercially available from the Richmond Division of Dixico Incorporated under the trademark A5000. If desired, the position of the coil 42 and the target 112 could be reversed such that the target 112 is in contact with the outer surface of the skin 44 and the coil 42 is bonded to the inner surface of the surface play 46.

Figure 7:
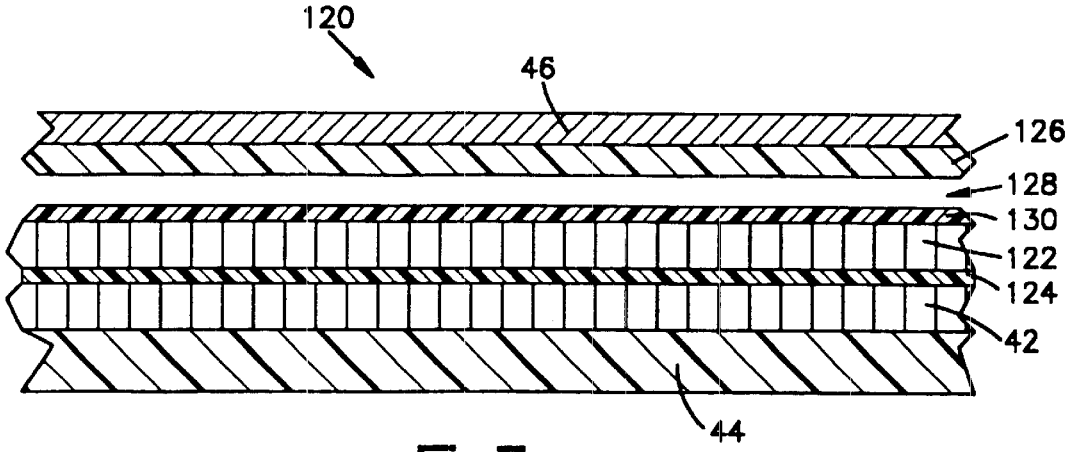
FIG. 7 is a cross-sectional view similar to FIG. 6 wherein a so-called displacement void is included as part of the de-icer.

Referring to FIG. 7, another alternative embodiment of the invention is indicated by the reference numeral 120. In this embodiment, the skin 44 is made of a composite material. The de-icer 120 includes a metal target 122 that is disposed on the second side of the coil 42. The coil 42 and the target 122 are separated by a separation ply, or release layer, indicated by the reference numeral 124. The filler layer 48 includes a backing portion 126 that extends across the front portion of the de-icer 120. The portion 126 is spaced from the outer surface of the target 122 by a void 128 and a release layer 130. The release layer 130 is in contact with the outer surface of the target 122. The surface ply 46 is bonded to the backing portion 126.

The de-icer 120 enhances the force that otherwise can be applied to the surface ply 46. During coil activation, the coil 42 remains in contact with the skin 44. The release layer 124 remains attached to the target 122 and separates from the coil 42. The target 122 is displaced away from, and thereafter toward, the coil 42. By incorporating the void 128 in the de-icer construction, the target 122 moves a considerable distance before the layer 130 impacts the backing portion 126. The momentum thus generated provides an enhanced impact force. In turn, it is expected that a shorter-duration current pulse can be used to produce equivalent de-icing action compared with the de-icer 40.

If desired, the skin 44 could be made of metal, in which case the target 122 would be eliminated. Further, the positions of the coil 42 and the target 122 could be reversed, as described with respect to the embodiment of FIG. 6.

Figure 8:
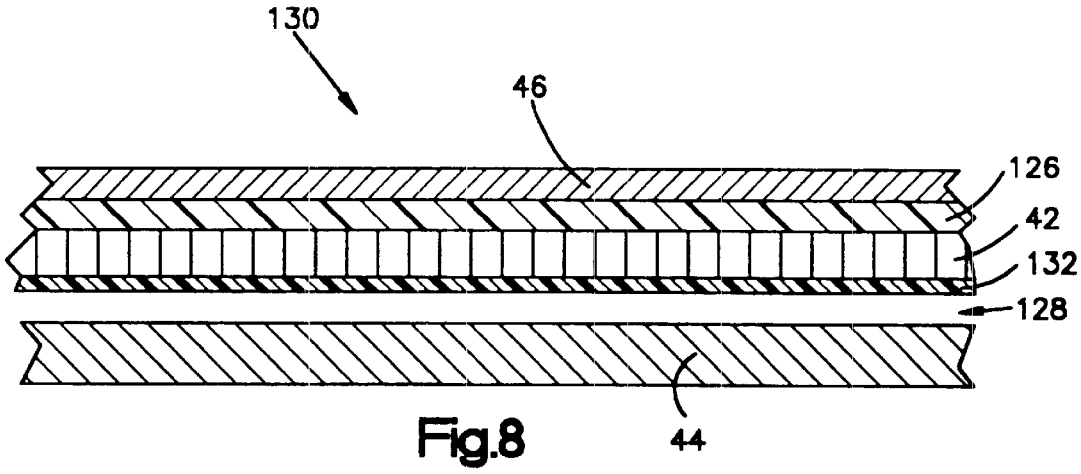
FIG. 8 is a cross-sectional view similar to FIG. 7 wherein the displacement void is disposed adjacent the structural member.

Referring to FIG. 8, an additional alternative embodiment of the invention as indicated by the reference numeral 130. The de-icer 130 is similar conceptionally to the de-icer 120. As illustrated, the skin 44 is made of metal. Instead of the void 128 being placed adjacent the backing portion 126, however, the void 128 is disposed intermediate the skin 44 and a release layer 132 that is in contact with the coil 42. In the de-icer 130, the target 122 has been eliminated, and the coil 42 is in contact with the inner surface of the backing portion 126. If the skin 44 is made of a composite material, then a metal target (not shown) could be used in conjunction with the coil 42. By using the de-icer 130, the retraction force that occurs during the fall of the shaped high-current pulse can enhance movement of the surface ply 46, thereby creating a very effective ice removal action.

Figure 11:
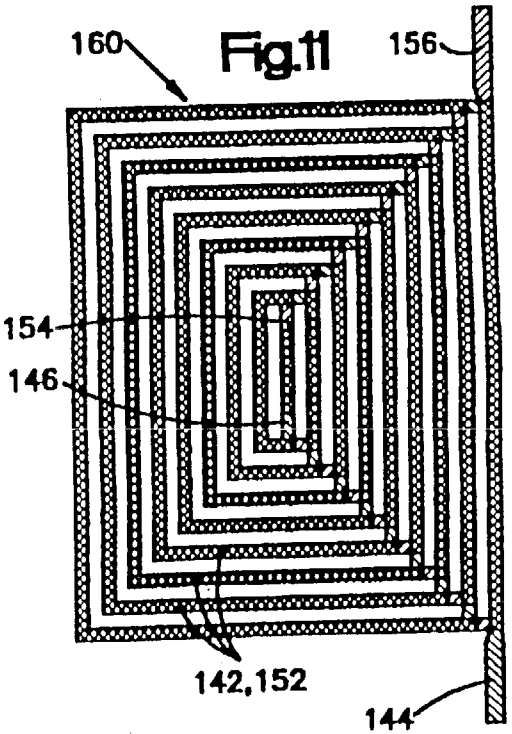
FIG. 11 is a top plan view of superimposed planar coils usable with the present invention.
Figure 10:
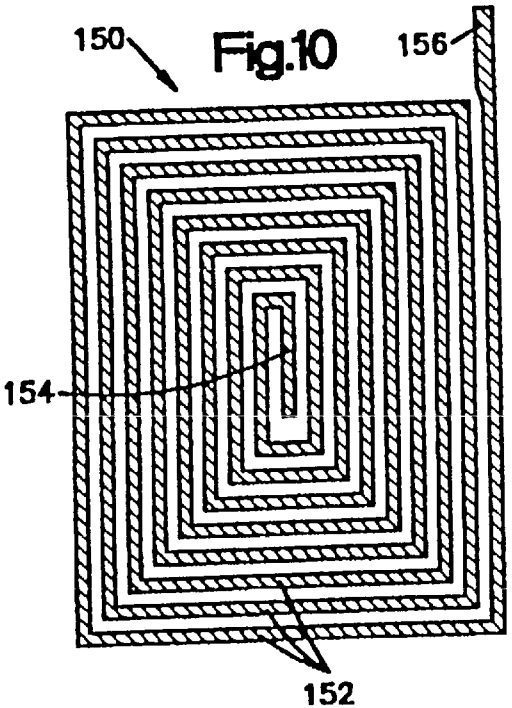
FIG. 10 is a top plan view of another planar coil usable with the present invention.
Figure 9:
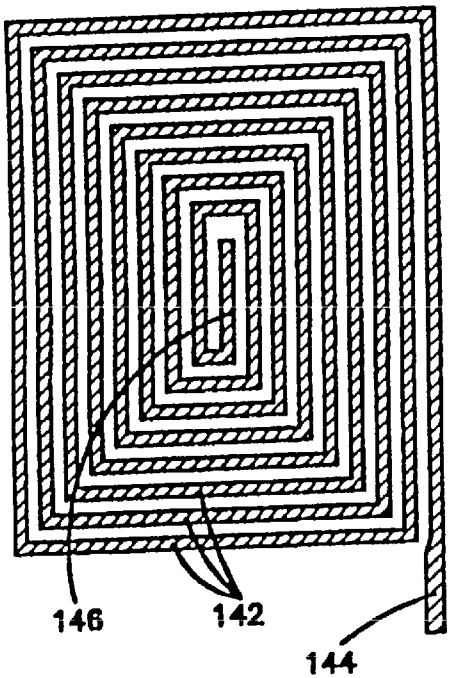
FIG. 9 is a top plan view of a planar coil usable with the present invention.

Referring to FIGS. 9–11, certain components of the coil 42 are shown. In FIG. 9, a first sheet-like member 140 is defined by a first, continuous electrical conductor having a plurality of turns 142, a first end 144 and a second end 146. The first end 144 defines an electrical input to the member 140, while the second end 146 defines an electrical output from the member 140. The member 140 is formed from a single sheet of unalloyed copper or aluminum having a thickness of about 0.016 inch. The turns 142 have a width within the range 0.070–0.125 inch.

In FIG. 10, a second, sheet-like member 150 is defined by a second, continuous electrical conductor having a plurality of turns 152, a first end 154, and a second end 156. The first end 154 defines an electrical input to the member 150, while the second end 156 defines an electrical output from the member 150. The member 150 is formed from a single sheet of unalloyed copper or aluminum having a thickness of about 0.016 inch. The turns 152 have a width within the range of 0.070–0.125 inch.

In FIG. 11, the members 140, 150 are illustrated in a "completely superimposed" coil arrangement indicated by the reference numeral 160. In this arrangement, the turns 142 are disposed immediately adjacent comparable turns 152. The ends 146, 154 are joined as by soldering to form an electrical connection. As will be appreciated from an examination of FIG. 11, electrical current directed into the first end 144 will follow a path through the turns 142 that is in the same direction as the current flow through the superimposed, adjacent turns 152. The first member 140 typically as 12¼ turns (8¼ turns are shown for clarity of illustration), as does the second member 150. Accordingly, the superimposed members 140, 150 define a coil 160 having 24¼ turns. Although the members 140, 150 are illustrated as being rectangular, they could be square, circular, or any other desired shape.

Figure 12:
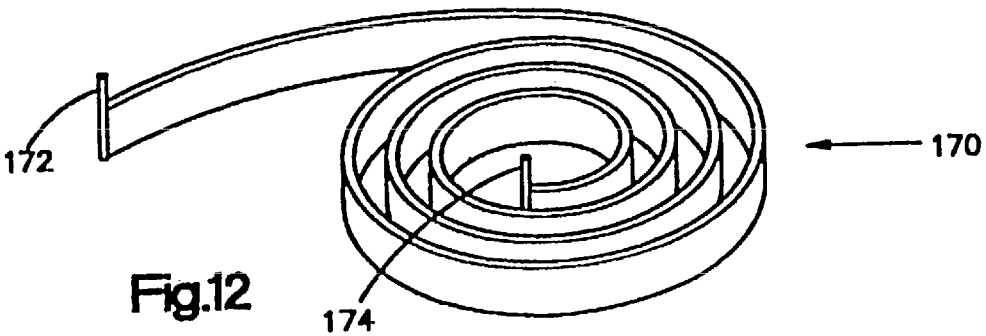
FIG. 12 is a perspective view of a spiral-wound coil usable with the present invention.

Referring to FIG. 12, a coil 170 is defined by a spiral-wound, continuous conductor that is formed from a flat ribbon having a width of approximately 0.19 inch and a thickness of approximately 0.025 inch. The coil 170 includes approximately 40 turns that are tightly wound to form an inner diameter of about 0.25 inch and an outer diameter of about 2.25 inches. The ends of the conductor are provided with connectors 172, 174 for connection to a source of electrical current. The coil 170 is less desirable than the coil 160, in part because of its greater thickness.

The coils 160, 170, in conjunction with other components such as suitable dielectric materials and encapsulation materials, are used to manufacture the coil 42. Additional details concerning the coil 42, including the materials and techniques that can be used to manufacture it, can be found a concurrently filed application entitled "Planar Coil Construction," application Ser. No. 07/437,489, filed Nov. 15, 1989, by Lowell J. Adams et al., and assigned to the assignee of the present invention.

Figure 13:
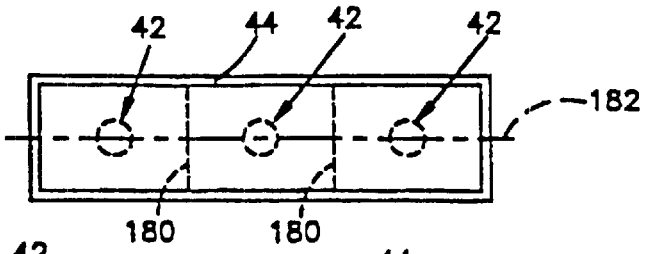
FIG. 13 is a schematic front elevational view of the leading edge of a structural member showing one arrangement of multiple de-icers according to the invention.
Figure 14:
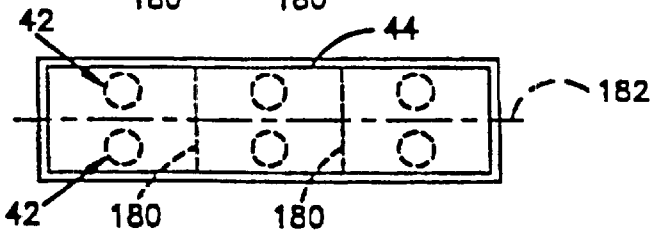
FIG. 14 is a view similar to FIG. 13 showing an alternative arrangement of multiple de-icers according to the invention.
Figure 15:
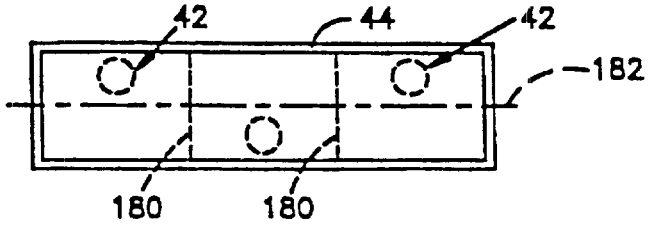
FIG. 15 is a view similar to FIG. 13 showing yet an additional arrangement of multiple de-icers according to the invention.

Referring now to FIGS. 13–15, various spanwise arrangements of the coils 42 are illustrated. In FIG. 13, the coils 42 are spaced approximately 16 inches, equidistantly on either side of ribs 180. The de-icers 40 are aligned with each other at the centerline of the leading edge of the skin 44. The centerline is indicated by the dashed line 182 in FIGS. 13–15.

In FIG. 14, upper and lower coils 42 are provided in a manner similar to that described for FIG. 13. As in FIG. 13, the coils 42 are spaced about 16 inches spanwise from each other, equidistantly on either side on the ribs 124 and equidistantly above and below the centerline 182.

In FIG. 15, the coils 42 are staggered spanwise relative to the centerline 182. That is, one coil 42 is disposed above the centerline 182, while adjacent coils 42 are disposed an equal distance below the centerline 182. As with the embodiments illustrated in FIGS. 13 and 14, the coils 42 in FIG. 15 are disposed about 16 inches apart, equidistantly on either side of the ribs 180.

By arranging the coils 42 as shown in FIGS. 13–15, expansive forces generated by the coils 42 create a small amplitude, high acceleration movement and stress-producing wave across the leading edge of the skin 44, causing ice to be broken up and shed. The impulse force of each coil 42 is dependent upon the size and construction of the coil 42 and the overall de-icer construction (as illustrated in FIGS. 4–8).

When the coils 42 are placed on the centerline 182 as shown in FIG. 13, the coils 42 may be energized sequentially or simultaneously (as elements 1, 2, 3, etc.), or as odd or even groups (1, 3, 5 . . . , or 2, 4, 6 . . . ). In the configuration shown in FIG. 14, the coils 42 may be energized sequentially or simultaneously as groups on the upper surface (1, 3, 5 . . . ) followed by groups on the lower surface (2, 4, 6 . . . ) or vice versa. The coils 42 also may be energized as staggered groups such as 1, 4, 5 . . . , followed by 2, 3, 6 . . . , or vice versa. In some cases, the number of coils 42 may be minimized as shown in FIG. 15, and energized in groups such as 1, 3, 5 . . . , followed by 2, 4, 6 . . . , or simultaneously as a staggered group 1, 2, 3 . . . . From the foregoing, it will be appreciated that the coils 42 can be attached to the skin 44 in a variety of placements and the coils 42 can be energized in a variety of sequences for effective de-icing action.

Figure 21:
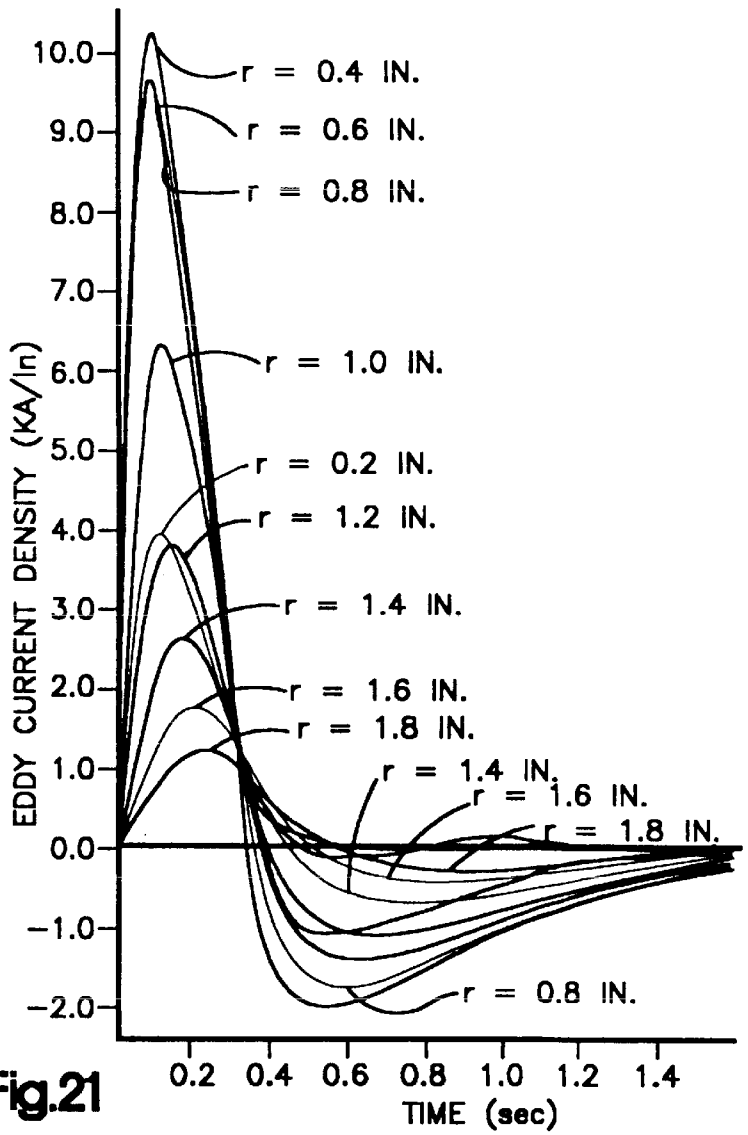
FIG. 21 is an eddy current density profile as a function of time for a one-inch radius coil.
Figure 20:
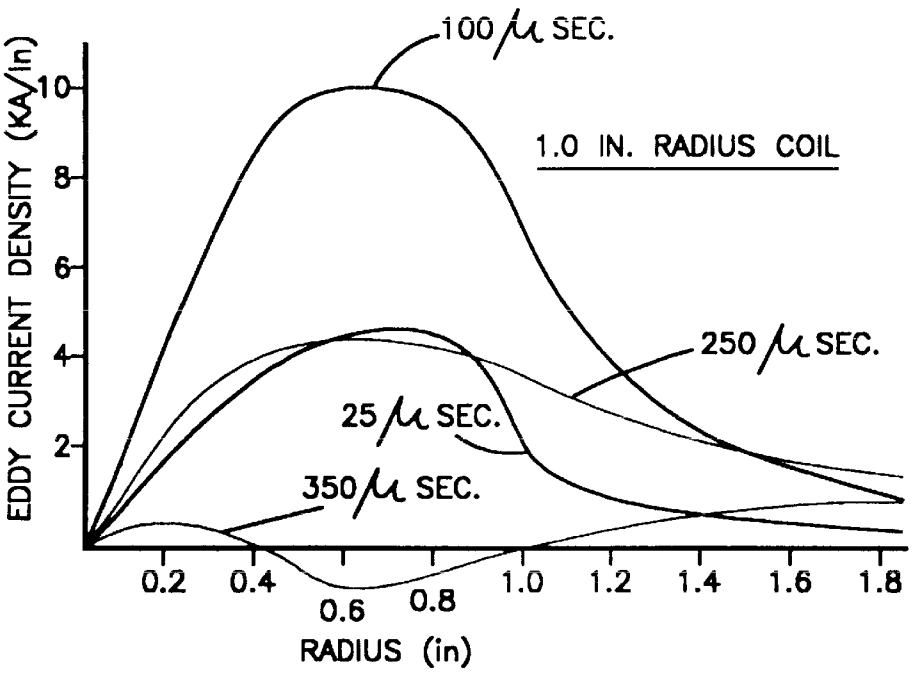
FIG. 20 is an eddy current profile for a one-inch radius coil.

Mechanical de-icers operating on the eddy current principle, such as that illustrated in FIG. 1, have used an inductor coil to induce eddy currents in a metal surface many times larger than the inductor coil itself. As shown in FIG. 20, for a one-inch radius coil, the eddy current is induced only into a limited radius around the coil. FIG. 21 indicates that the eddy current density decays rapidly, particularly at distances away from the center of the coil. Most force is generated within a 1.25×radius distance of the inductor coil radius. For existing applications where the skin of the structural member is thin, a metal doubler or target with a radius of about 25% larger than the inductor coil radius is adequate to enhance the impulse force produced.

The de-icer according to the invention shown in FIGS. 6 and 7 uses a target included as part of the de-icer itself without the requirement of using the skin of the structural member as a target. Although certain of the embodiments described herein (particularly that shown in FIG. 4) use a metal skin to contribute to the resulting impact force produced by eddy currents, such usage of the skin is not necessary to proper functioning of the invention (except for the embodiment of FIG. 4). The invention will function adequately with skins made of non-metal materials such as graphite/epoxy.

Figure 22:
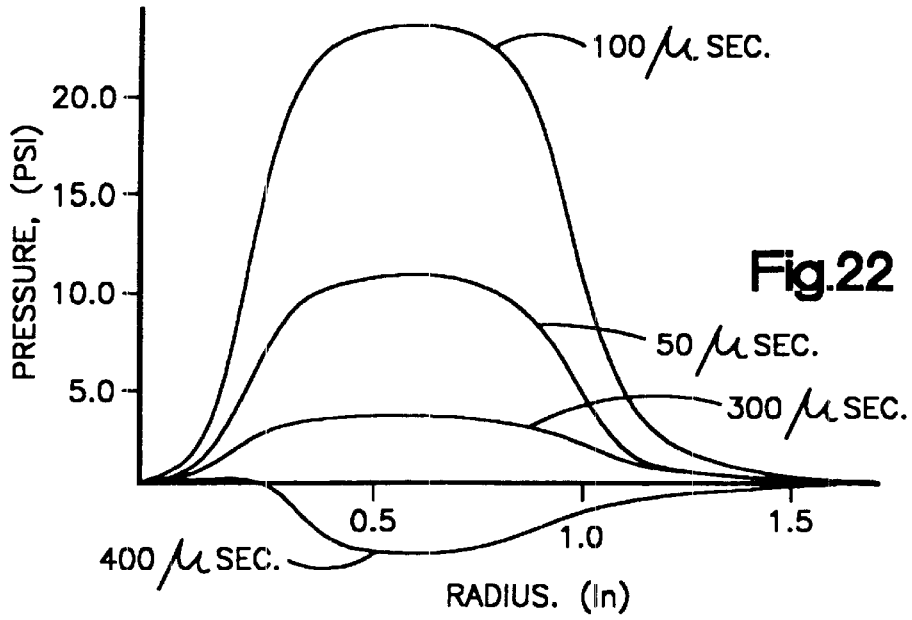
FIG. 22 is a plot of pressure distribution on a metal target as a function of the radius of the target.

Referring to FIG. 22, a plot of pressure on a metal target (expressed as eddy current density) versus time at various radii is illustrated. Almost all of the pressure is generated within a distance of 1.25 times the radius of the inductor coil. Thus, targets utilized with the present invention need only approximate the size and shape of the inductor coil for effective force generation. At most, the target should have a radius 25% larger than that of the coil.

Figure 23:
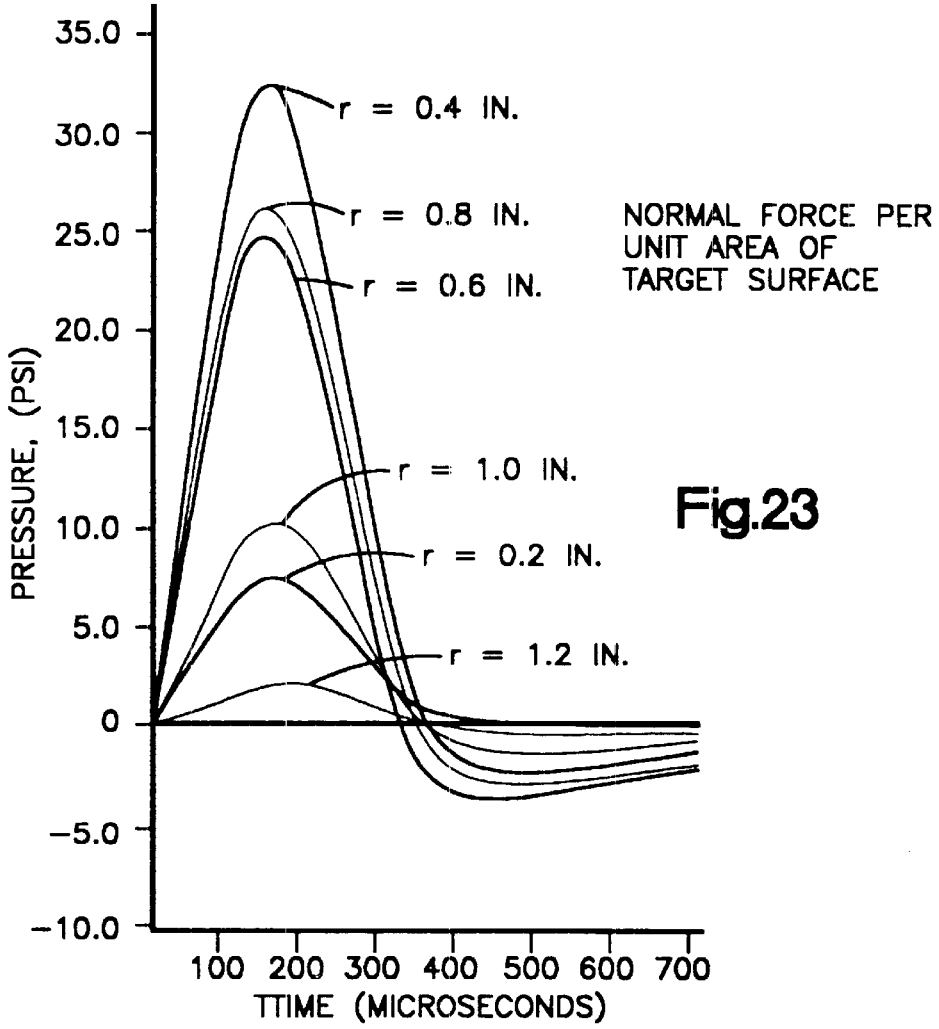
FIG. 23 is a plot of pressure distribution on a metal target versus time at various radii.

Forces on the metal target consist of a normal force acting outwardly, away from the inductor coil, which force varies with radius. This variable force is represented in FIG. 23 which is a plot of pressure versus time at various radii from the center of the target. The lines on the right side of FIG. 23 pass below the abscissa, indicating that the force on the target reverses in direction with the collapsing magnetic field. As indicated previously, this feature of the invention means that the target not only is powered outwardly, but is powered inwardly as well.

Figure 25:
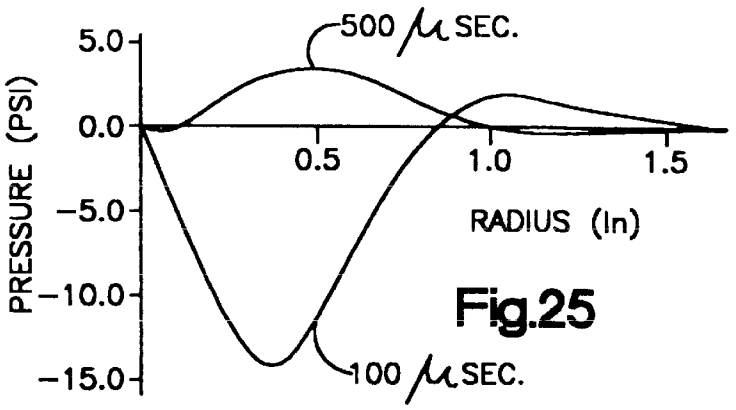
FIG. 25 is a plot of radial distribution of in-plane pressure per unit target area.
Figure 24:
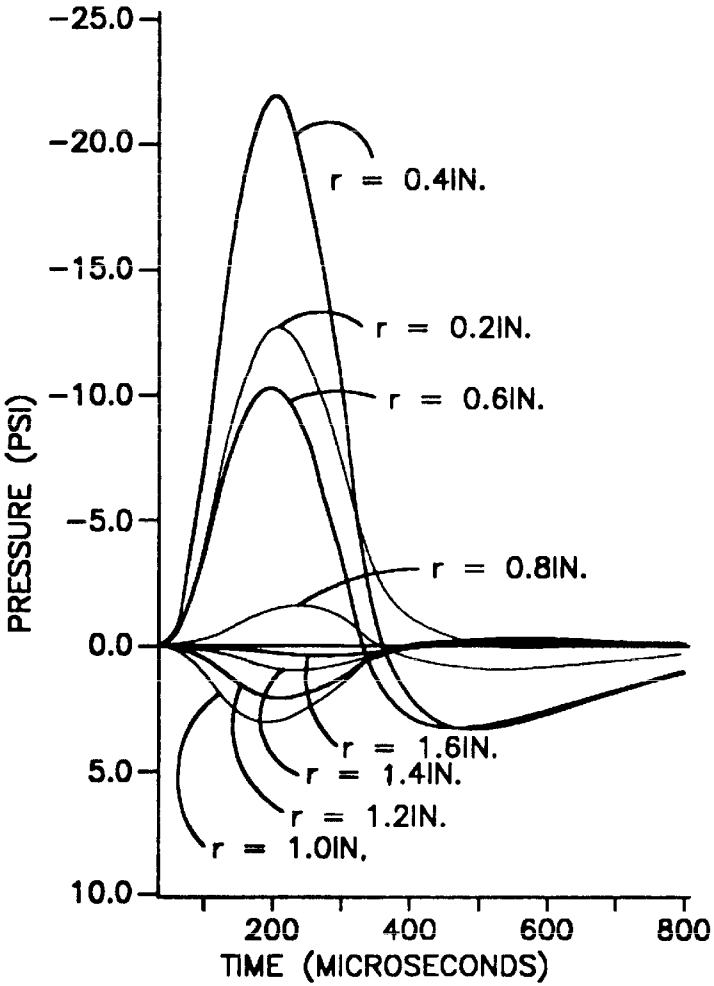
FIG. 24 is a plot on in-plane pressure per unit target area.

There also is a radially acting force that initially tends to compress, or shrink, the target and which then tends to expand the target. The radially acting forces can be used to advantage when conducting de-icer operations because the radially acting forces create a pressure distribution wave (ripple effect) that acts across the surface of the de-icer when the target flexes. Typical radially acting forces on the targets are shown in FIGS. 24 and 25. FIG. 24 is a plot of radial in-plane force per unit area of target surface, while FIG. 25 is a plot of radial distribution of in-plane force per unit target area. In FIG. 24, pressure is plotted versus time for various radii. In FIG. 25, pressure is plotted versus radius for various times. As with FIGS. 20–23, FIGS. 24 and 25 show that the eddy current-created force peaks rapidly and decays rapidly. FIGS. 24 and 25 also show that radial forces at a distance greater than 25% of coil radius are not significant.

Figure 26:
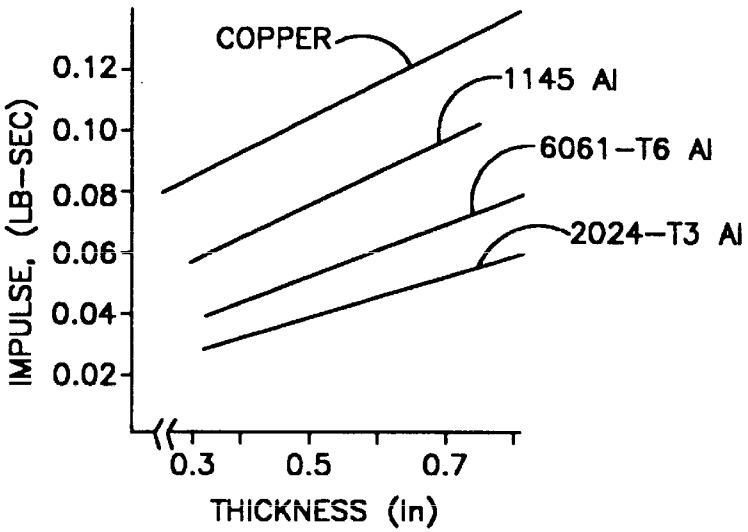
FIG. 26 is a plot of impulse versus target thickness for various target materials.

The impulse force produced by the inductor coil is dependent on the diameter of the target, the thickness of the target, and the material from which the target is made. The conductivity of the material as well as its thickness determine the eddy current that will be produced for a particular spacing between the inductor coil and the target. The shape of the inductor coil and the shape of the target also may be varied to obtain a maximum impulse force for a particular construction such as a curved airfoil. FIG. 26 is a plot of impulse force versus target thickness for various target materials. Although copper is seen to produce the best impulse curve, other materials such as 1145 aluminium provide acceptable performance.

Other design considerations in addition to target size and thickness include whether the target should be laminated (two or more layers) and whether the layers should be made of the same material. As to thickness, it is believed desirable to provide a target having a thickness of about one electrical skin depth for best impulse production. If desired, the target can be made of two layers—one for strength and a second layer of different material having improved electrical conductivity. It has been found that increasing the target thickness increases the impulse produced. Nevertheless, the target generally should be kept as thin as possible in order to minimize weight and disruptions to the contour of the structural member. In work with the design of doublers (targets on inner surface of structural member), it has been found suitable to choose a double thickness that equals one-half the electrical skin depth at the circuit frequency.

It also has been found that matching the electrical period and the mechanical period gives the best results. Specifically, the electrical period should be chosen to be one-eighth that of the natural period. If the coil current has a long rise time, a thicker target is required. Test results with prior mechanical de-icers that employ doublers indicate that that the optimum electrical period is twice the mechanical period. It is believed that a similar relationship between the mechanical and electrical period apply to the present invention.

Previous test results have utilized a uniform thickness of airfoil skin and/or doubler. It is possible that the thickness and shape of the target, and the spacing of the target from the coil, can be varied to tailor the force produced in the target and to enhance transfer of the force to ice-shedding surfaces.

Although the invention has been described in its preferred form with a certain degree of particularly, it will be understood that the present disclosure of the preferred embodiment has been made only by way of example, and that various changes may be resorted to without departing from the true spirit and scope of the invention as hereinafter claimed. It is intended that the patent shall cover, by suitable expression in the appended claims, whatever features of patentable novelty exist in the invention disclosed.

*The present invention provides a planar coil construction especially adapted for use as part of a de-icer that may be attached to the leading edges of structural members. De-icing is the removal of ice subsequent to its formation upon a leading edge. A leading edge is that portion of a structural member that functions to meet and break an airstream impinging upon the surface of the structural member. Examples of leading edges are the forward portions of wings, stabilizers, struts, nacelles, rotors and other housings and protrusions first impacted by an airstream.*

*Although the planar coil construction of the present invention is described in the environment of a de-icer, it is to be understood that the invention can be used in other environments. For example, the invention could be used as a force-generating element in a vibratory conveyor, as a switching device, or in a variety of other applications. Accordingly, the invention as described and claimed herein shall not be limited solely to use in de-icer applications.*

*Referring to FIG. 27, a first, sheet-like member is indicated by the reference numeral 210. The member 210 is defined by a first, continuous, electrical conductor having a plurality of turns 212, a first end 214 and a second end 216. The first end 214 defines an electrical input to the member 210, while the second end 216 defines an electrical output from the member 210. The member 210 is formed from a single sheet of unalloyed copper of aluminum having a thickness of about 0.016 inch. The turns 212 have a width within the range of 0.070–0.125 inch.*

*The first end 214 is disposed at one corner of the member 210, while the second end 216 is disposed at the center. Although the member 210 is illustrated as being rectangular, it could be square, circular, or any other desired shape.*

*Referring to FIG. 28, a second, sheet-like member is indicated by the reference numeral 220. The member 220 is defined by a second, continuous, electrical conductor having a plurality of turns 222, a first end 224, and a second end 226. The first end 224 defines an electrical input to the member 220, while the second end 226 defines an electrical output from the member 220. The member 220 is formed from a single sheet of unalloyed copper or aluminum having a thickness of about 0.016 inch. The turns 222 have a width within the range of 0.070–0.125 inch. As with the member 210, the member 220 is rectangular, with one end disposed at a corner and the other end disposed at the center.*

*Referring to FIG. 29, the members 210, 220 are illustrated in a "completely superimposed" arrangement to form a coil indicated by the reference numeral 230. In this arrangement, the turns 212 are disposed immediately adjacent comparable turns 222. The ends 216, 224 are joined as by soldering or welding to form an electrical connection. As will be appreciated from an examination of FIG. 29, electrical current directed into the first end 214 will follow a path through the turns 212 that is in the same direction as the superimposed, adjacent turns 222. The first member 210 typically has 12⅛ turns, as does the second member 220. (An 8⅛ turn member is shown for clarity of illustration). Accordingly, the superimposed members 210, 220 define a coil pair 230 having 24½ turns.*

*Referring to FIG. 30, two assembled coil pairs 230 have been formed as shown in FIG. 30, and are "partially superimposed" with respect to each other. The resultant coil construction, indicated by the reference numeral 240, includes about 25% of the total turns overlapped at the center of the assembled coil pairs 230.*

*Referring to FIG. 31A, arrangements of two coil pairs 230 are shown as they might be used in practice to form part of a de-icer. As is explained in more detail in the Electro-Repulsive Separation System Patent, upon supplying a short-duration, shaped, high-current pulse to the coil pairs 230, the outermost portion of the de-icer will be distended as indicated at 242 so as to shatter, debond, and expel any ice that may have accumulated thereon. Referring to FIG. 31B, the coil airs 230 are partially superimposed and an enhanced force will be generated in the region of the overlap where, presumably, the de-icing action will be enhanced. The enhanced distension of the de-icer is indicated by the reference numeral 244.*

*Referring to FIG. 32, an alternative construction of a sheet-like member is indicated schematically by the reference numeral 250. The member 250, like the members 210, 220, is defined by a first, continuous, electrical conductor having a plurality of turns 252, a first end 254, and a second end 256. Unlike the members 210, 220, the second end 256 crosses a portion of the turns 252 and is disposed adjacent the first end 254 at a location outside the outermost turn 252. The first end 254 defines an electrical input to the member 250, while the second end 256 defines an electrical output from the member 250. The second end 256 is electrically isolated from the turns 252 that are crossed. The member 250 is formed from a single sheet of unalloyed copper or aluminum having a thickness of about 0.016 inch. The turns 252 have a width within the range of 0.070–0.125 inch.*

*Referring to FIG. 33, an assembled coil construction employing four sheet-like members 250 is indicated schematically by the reference numeral 260. Pairs of the members 250 are separated by dielectric layers 262 as well as the second end 256 of the members 250. The dielectric layers 262 preferably are formed of a material such as two layers of polyamide film, each having a thickness of about 0.003 inch. A suitable polyamide film is available from the E.I. Dupont deNemours & Company under the trademark KAPTON. Before use, the film should be surface-treated by acid-etching, plasma treating or the like to improve adhesion.*

*Referring to FIG. 34, the members 250 of the coil assembly 260 are shown displaced relative to each other for purposes of illustrating the directions of current flow therein. The uppermost member 250 is shown in solid lines, while the immediately adjacent lower member 250 is shown by dashed lines. As can be seen in FIG. 34, the second end 256 of the uppermost sheet 250 is electrically connected to the first end 254 of the immediately adjacent lower member 250. The output of the lower member 250 is directed through the end 256 to the second end 256 of the lower member 250 of the adjacent coil pair. The lower coil pair members 250 are connected in the same manner as the upper coil pair members 250. However, because the electrical input is to the second end 256 of the lower member 250, current flow through the lower coil pairs is in a direction opposite to that of the upper coil pairs. As shown in FIG. 34, current flow through the upper coil pairs is in a clockwise direction, while current flow through the lower coil pairs is in a counterclockwise direction. Due to the opposing directions of current flow in the upper coil pair and lower coil pair conductors, and because the coil pairs are separated by the KAPTON film 262, upon supplying a short-duration, high-current pulse to the coil 260, the respective upper and lower coil pairs will be forcefully displaced away from each other. This would constitute a force element for an electro-repulsive type of de-icer.*

*As in the de-icer schematically indicated by FIG. 31A, the displacement of the coil force elements can be utilized in a de-icer to provide de-icing action. If the direction of current flow in the lower coil pair is reversed by electrically connecting the upper coil pair second end 256 to the first end 254 of the adjacent lower coil pair, current flow through the lower coil pair is in the same direction as that of the upper coil pair. The coil pairs thus may be used in an eddy current type of de-icer construction.*

*Referring to FIGS. 35A–35G, a schematic view of planar coils according to the invention during their manufacture for an eddy current de-icer is illustrated. It will be assumed that the arrangement shown in FIGS. 35A–35G incorporates the members 210, 220, although the members 250 could be employed with equal facility.*

*In FIG. 35A, the member 210 is illustrated as it is manufactured initially in an etching operation. In such an operation, a sheet of unalloyed copper is attached to a backing sheet 270. The copper sheet is coated with a substance, such as a photo-resist material, that is impervious to an etching material such as sulfuric acid. The backing sheet 270 also is impervious to the acid. Upon applying the acid to the surface of the copper sheet, copper will be removed in those areas not protected by the photo-resist material. After the copper in the unprotected areas has been removed, the sheet will take the appearance of the member 210 shown in FIG. 27. The member 210 also could be formed in a stamping operation or a matching operation. If desired, the member 210 could be made from a continuous flat-braided conductor.*

*In order to process the member 210 further, it is necessary to remove it from the backing sheet 270. This result is accomplished by applying a layer of double-sided tape 272 to the exposed surface of the member 210. The tape 272 has a thickness of about 0.0045 inch. A suitable tape 272 can be obtained from Fasson Corporation under the trademark FASTAPE A. Upon lifting the tape 272, the member 210 will be removed from the backing sheet 270. The edges of the tape 272 are trimmed to closely approximate the outer dimensions of the member 210. Thereafter, the exposed adhesive side of the tape 272 can be attached to a layer of dielectric material such as KAPTON film. The dielectric layer is indicated in FIG. 35C by the reference numeral 274. Similarly, the member 220 can be manufactured in an etching process and removed from its back sheet 270 by means of a second layer of double-sided tape 272. Upon attaching the exposed surface of the second double-sided tape 272 to the exposed surface of the dielectric layer 274, the sandwiched coil construction 230 shown in FIG. 35C will be obtained. As shown in FIG. 35G, the layer 274 extends laterally beyond the edges of the members 210, 220 and the tape 272 to form a border approximately 0.25 inch wide that prevents arcing between the edges of the members 210, 220.*

*In order to protect the members 210, 220 and to provide a dielectric effect, it is desired that the members 210, 220 be encapsulated in some manner. Referring to FIG. 35D, the coil assembly 230 of FIG. 35C is illustrated as being sandwiched between layers 276 of a composite material such as fiberglass/epoxy. A suitable fiberglass/epoxy material can be obtained from Fiberite Corporation under the trademark MXB 7669/7781. After the layers 276 are assembled as illustrated in FIG. 35D, the assembled components are placed in a mold where heat and pressure can be applied so as to conform the coil construction 230 to any desired contour. Although the embodiment illustrated in FIG. 35D is flat, a curved contour should be employed if the coil assembly 230 is to be attached to the curved surface of a structural member. During the application of heat and pressure to the layers 276, it is expected that they will flow at least to a small extent so that gaps between adjacent turns 212, 222 will be filled. The initial thickness of each layer 276 is about 0.010 inch, and the final thickness of each layer 276 is about 0.005–0.006 inch. Also, the edges of the layers 276 will be compressed toward each other to form a tapered configuration that assists in matching the contour of the structural member with which the coil assembly 230 is to be used.*

*Referring to FIG. 35E, the coil assembly 230 of FIG. 35D is shown as it might be attached to the external surface of a metal structural member 278. The innermost fiberglass/epoxy layer 276 is spaced from the structural member 278 by means of a release layer 280 that permits the coil assembly 230 to move away from and toward the structural member 278. The layer 280 is very thin (about 0.001 inch) and can be obtained from the Richmond Division of Dixico Incorporated under the trademark A5000. A surface ply 282 is positioned over the outermost surface of the exposed layer 276. The ply 282 is secured to the exposed layer 276 by an adhesive such as EA951 commercially available from the Hysol Corporation. If the ply 282 is made of metal such as titanium, aluminum or stainless steel, it should be surface-treated for better adhesion. If the ply 282 is made of a thermoplastic material such as polyetherether ketone (PEEK), surface-treating also is necessary. If the ply 282 is made of another type of thermoplastic material, surface-treating may not be necessary. A metal ply 282 will have a*

*thickness of about 0.005 inch while a non-metal ply 282 will have a thickness of about 0.015 inch. The ends of the layers 280, 282 are attached to the structural member 278 by bonding or any other suitable technique. Typically, an elastomeric support (not shown) would be provided at the ends of the layers 280, 282 in order to provide a smooth transition to the contour of the member 278 and to assist in securing the layers 280, 282 relative to the remainder of the de-icer structure. Regardless of how the layers 280, 282 are connected to the structure 278, it is necessary that at least the layer 282 be able to move away from, and toward, the structural member 278.*

*In operation, upon supplying a short-duration, shaped, high-current pulse to the coil 230, an electromagnetic field will be generated that will induce eddy currents in the structural member 278 and to a lesser extent in the thin surface ply 282. The eddy currents then will generate electromagnetic fields which will tend to repel the electromagnetic field of the coil 230. In turn, the coil 230, with the surface ply 282 attached, will be forcefully displaced away from the structural member 278. Upon collapse of the magnetic fields, the coil 30 and the surface ply 282 will be forcefully retracted against the structural member 278 to that position shown in FIG. 35E. If the structural member 278 is made of a composite material such as graphite/epoxy instead of metal, a metal target (so-called "doubler") should be disposed on the outside or inside of the member 278.*

*An additional variation is shown in FIG. 35F. In FIG. 35F, a release layer 284 is disposed intermediate the outermost encapsulating layer 276 and the surface ply 282. Accordingly, the surface ply 282 can move away from, and toward, the coil 230 upon energization thereof. Because the release layer 280 is used in the embodiment shown in FIG. 35F, the coil 230 will move away from, and toward, the structural member 278 if the member 278 is made of metal. If the member 278 is made of a composite member, then the coil 230 will remain in contact with the outer surface of the member 278. In such a circumstance, it may be desirable to eliminate the release layer 280 and bond the innermost encapsulating layer 276 to the member 278 by means of an adhesive such as EA951. Regardless of the material from which the member 278 is made, it will be appreciated that the surface ply 282 always will be forcefully displaced away from, and toward, the member 278 so as to effect a de-icing action.*

*Referring to FIG. 36, a plot of force versus current is shown for coils constructed and arranged as shown in FIGS. 33 and 34 as a force element for an electro-repulsive type of de-icer. The tests that were conducted to generate the graph of FIG. 36 were laboratory vice tests in which a transducer was disposed intermediate the adjacent coil pairs 250. The lower plot indicated by the reference numeral 286 shows that the force produced by the coil 260 is a direct function of the current supplied thereto. The uppermost curve indicated by the reference numeral 288 shows that disposing a paramagnetic target material (in this case 6061 aluminum, having a thickness of 0.060 inch) adjacent the outer surface of one of the members 250 produced an enhanced separation force. The difference ranges from approximately 19% at lower current levels to 9% at higher current levels. FIG. 36 confirms that coil pairs operating on the so-called "electro-expulsion" principle such as that disclosed in the Electro-Repulsive Separation System Patent have excellent force-generating capabilities, but that such capabilities can be enhanced by the use of a metal target disposed in proximity with the coils. It is believed that this result is brought about by eddy currents that are induced in the target that create an electromagnetic field that interacts with the electromagnetic field generated by the coil 260. In effect, the magnetic target improves or shapes the magnetic field generated by the coil 260. It is believed that the plot 286 would be representative of the force produced by attaching the coil 260 to a composite structural member 278, while the plot 288 would be representative of the results produced by attaching the coil 260 to a metal structural member 278 or by using a metal surface ply 282 in conjunction with 0.060 inch thick metal targets adjacent the coils.*

*Although the invention has been described in its preferred form with a certain degree of particularity, it will be understood that the present disclosure of the preferred embodiment has been made only by way of example, and that various changes may be resorted to without departing from the true spirit and scope of the invention as hereinafter claimed. It is intended that the patent shall cover, by suitable expression in the appended claims, whatever features of patentable novelty exist in the invention disclosed.*

What is claimed is:

1. A de-icer especially adapted for attachment to the outer surface of a metal structural member, the de-icer having an exposed surface upon which ice accumulates during flight, comprising:

a unitary inductor coil, the coil having a first side disposed in proximity with the outer surface of the structural member and a second side spaced from the outer surface of the structural member;

support means for supporting the coil, the support means being disposed in proximity with the second side of the coil and defining the exposed surface of the de-icer, the support means being flexible in order to dislodge ice accumulated on the exposed surface upon movement of the coil relative to the structural member; and means for supplying a short-duration, high-current electrical pulse to the coil.

2. The de-icer of claim 1, wherein the structural member includes a leading edge having a centerline, and a first coil is disposed above the centerline, and a second coil is disposed below the centerline.

3. The de-icer of claim wherein the structural member includes a leading edge having a centerline, and a plurality of coils are spaced spanwise along the leading edge in the vicinity of the centerline.

4. The de-icer of claim 1, wherein the coil and the support means are formed in an integral construction that is attachable to the outer surface of the structural member without modification of the structural member.

5. The de-icer of claim 4, wherein the support means includes a non-metal layer bonded to the structural member, and the coil is movable relative to the non-metal layer.

6. The de-icer of claim 1, wherein the coil is planar.

7. The de-icer of claim 1, wherein the coil is planar and is formed of multiple layers.

8. The de-icer of claim 1, wherein the support means includes a flexible, non-metallic layer that is bonded to the outer surface of the structural member, and a surface ply that overlies at least a portion of the flexible, non-metallic layer.

9. The de-icer of claim 8, wherein the surface ply is made of metal.

10. The de-icer of claim 8, wherein the surface ply is made of a thermoplastic film.

11. The de-icer of claim 1, further comprising a metal target disposed intermediate the first side of the coil and the outer surface of the structural member.

12. The de-icer of claim 1, wherein the support means includes a metal portion disposed in proximity with the second side of the coil.

13. The de-icer of claim 1, further comprising a metal target disposed on the inner surface of the structural member opposite the coil.

14. The de-icer of claim 1, further comprising a displacement void disposed intermediate of the second side of the coil and the support means.

15. The de-icer of claim 14, further comprising a metal target disposed intermediate the coil and the displacement void.

16. The de-icer of claim 16, further comprising a displacement void disposed intermediate the first side of the coil and the outer surface of the structural member.

17. The de-icer of claim 16, further comprising a metal target disposed intermediate the coil and the structural member.

18. A de-icer especially adapted for attachment to the outer surface of a non-metal structural member, the de-icer having an exposed surface upon which ice accumulates during flight, comprising:

a unitary inductor coil, the coil having a first side disposed in proximity with the outer surface of the structural member and a second side spaced from the outer surface of the structural member;

support means for supporting the coil, the support means being disposed in proximity with the second side of the coil and defining the exposed surface of the de-icer, the support means including a metal portion in proximity with the second side of the coil, the support means being flexible in order to dislodge ice accumulated on the exposed surface upon movement of the coil relative to the metal portion; and means for supplying a short-duration, high-current electrical pulse to the coil.

19. The de-icer of claim 18, wherein the metal portion of the support means comprises a target disposed in proximity with the second side of the coil.

20. The de-icer of claim 18, wherein the metal portion of the structural means is eliminated and further comprising a metal target disposed intermediate the first side of the coil and the outer surface of the structural member.

21. The de-icer of claim 18, wherein the support means includes a surface ply made of metal disposed in proximity with the second side of the coil.

22. The de-icer of claim 18, further comprising a metal target disposed on the inside of the structural member opposite the coil.

23. The de-icer of claim 18, further comprising a displacement void disposed intermediate the second side of the coil and the support means.

24. The de-icer of claim 23, further comprising a metal target disposed intermediate the coil and the support means.

25. The de-icer of claim 18, further comprising a displacement void disposed intermediate the first side of the coil and the outer surface of the structural member.

26. The de-icer of claim 25, further comprising a metal target disposed intermediate the coil and the structural member.

27. The de-icer of claim 18, wherein the structural member includes a leading edge having a centerline, and a first coil is disposed above the centerline, and a second coil is disposed below the centerline.

28. The de-icer of claim 18, wherein the structural member includes a leading edge having a centerline, and a plurality of coils are spaced spanwise along the leading edge in the vicinity of the centerline.

29. The de-icer of claim 18, wherein the coil and the support means are formed in an integral construction that is attachable to the outer surface of the structural member without modification of the structural member.

30. The de-icer of claim 29, wherein the support means includes a non-metal layer bonded to the structural member, and the coil is movable relative to the non-metal layer.

31. The de-icer of claim 18, wherein the coil is planar.

32. The de-icer of claim 18, wherein the coil is planar and is formed of multiple layers.

33. The de-icer of claim 18, wherein the support means includes a flexible, non-metallic layer that is bonded to the outer surface of the structural member, and a surface ply that overlies at least a portion of the flexible, non-metallic layer.

34. The de-icer of claim 33, wherein the surface ply is made of metal.

35. The de-icer of claim 33, wherein the surface ply is made of a thermoplastic film.

36. A method for de-icing the outer surface of a metal structural member, comprising:

providing a unitary inductor coil having a first side and a second side;

disposing the first side of the coil in proximity with the outer surface;

providing a support means for supporting the coil, the support means defining an exposed surface of the / upon which ice accumulates during flight;

energizing the coil by means of a short-duration, high-current electrical pulse so as to create eddy currents in the structural member;

displacing the coil away from the structural member;

displacing the exposed surface of the de-icer away from the structural member to an extent and at an acceleration rate sufficient to dislodge ice accumulated on the exposed surface; and displacing the coil and the support means to rest positions adjacent the structural member and the coil, respectively.

37. The method of claim 36, wherein the current supplied to the coil is approximately 3000 amps.

38. The method of claim 36, wherein the step of displacing the exposed surface of the de-icer is accomplished with a displacement of approximately 0.065 inch and at an acceleration rate of approximately 18,750 G's.

39. The method of claim 36, further comprising the step of providing a metal target intermediate the coil and the support means, the metal target being displaced away from the coil upon energization of the coil.

40. The method of claim 36, further comprising the step of providing a metal target intermediate the coil and the structural member, the coil being displaced away from and toward the target upon energization of the coil.

41. The method of claim 36, further comprising the step of providing a metal target on the inner surface of the structural member opposite the coil, the target being bonded to the structural member so as to prevent relative movement therebetween.

42. The method of claim 36, further comprising the step of providing a displacement void intermediate the coil and the support means, the void permitting the coil to move relative to the support means before impacting the support means upon energization of the coil.

43. The method of claim 42, further comprising the step of providing a metal target intermediate the coil and the support means.

44. The method of claim 36, further comprising the step of providing a displacement void intermediate the coil and the structural member, the void permitting the coil to move a relatively great distance toward the structural member upon the occurrence of the step of displacing the coil and the support means to rest positions adjacent the structural member and the coil, respectively.

45. The method of claim 44, further comprising the step of providing a metal target intermediate the coil and the structural member.

46. The method of claim 36, further comprising the steps of:

providing a plurality of inductor coils spaced from each other; and energizing the coils sequentially in order to create a ripple effect in the support means.

47. A method for de-icing an outer surface of an nonmetal structural member comprising:

providing a unitary inductor coil having a first side and a second side;

disposing the first side of the coil in proximity with the outer surface;

providing a support means for supporting the coil, the support means including a metal target disposed in proximity with the coil, the support means defining an exposed surface of the de-icer upon which ice accumulates during flight;

energizing the coil by means of a short-duration, high-current electrical pulse so as to create eddy currents in the metal target;

displacing the exposed surface of the de-icer away from the structural member to an extent and at an acceleration rate sufficient to dislodge ice accumulated on the exposed surface; and displacing the support means to a rest position adjacent the coil.

48. The method of claim 47, wherein the current supplied to the coil is approximately 3000 amps.

49. The method of claim 47, wherein the step of displacing the exposed surface of the de-icer is accomplished with a displacement of approximately 0.065 inch and at an acceleration rate of approximately 18,750 G's.

50. The method of claim 47, further comprising the steps of providing a metal target intermediate the coil and the support means, and displacing the metal target away from the coil upon energization of the coil.

51. The method of claim 50, further comprising the step of providing a displacement void intermediate the target and the support means, the void permitting the target to move relative to the support means before impacting the support means upon energization of the coil.

52. The method of claim 47, further comprising the steps of providing a metal target intermediate the coil and the structural member, and displacing the coil away from the target upon energization of the coil.

53. The method of claim 52, further comprising the step of providing a displacement void intermediate the target and the structural member, the void permitting the coil to move a relatively great distance toward the structural member upon the occurrence of the step of displacing the support means to a rest position.

54. The method of claim 47, further comprising the steps of providing a metal target on the inner surface of the structural member opposite the coil, and bonding the target to the structural member so as to prevent relative movement therebetween.

55. The method of claim 47, further comprising the step of providing a displacement void intermediate the coil and the support means, the void permitting the coil to move relative to the support means upon the occurrence of the step of energizing the coil.

56. The method of claim 47, further comprising the step of providing a displacement void intermediate the coil and the structural member, the void permitting the coil to move a relatively great distance toward the structural member upon the occurrence of the step of displacing the support means to a rest position.

57. The method of claim 47, further comprising the steps of:

providing a plurality of inductor coils spaced from each other; and energizing the coils sequentially in order to create a ripple effect in the support means.

*58. The deicer of claim 11 wherein a flexible non-metallic layer is bonded to the outer surface of the structural member and a thermoplastic film surface ply overlies at least a portion of the flexible, non-metallic layer and wherein an insulating thermoplastic release material is positioned between the coil and the metal target.*

*59. The deicer of claim 35 wherein an insulating thermoplastic release material is positioned between the coil and the metal portion.*

*60. The deicer of claim 1 or claim 18 wherein the coil is in the shape of a spiral with electrical connections at both ends thereof.*

*61. The deicer of claim 1 or claim 18 wherein the coil comprises two spirals separated from each other by a dielectric layer with the two spirals being electrically connected to form a continuous coil.*

* * * * *